United States Patent [19]
Shidara et al.

[11] Patent Number: 5,963,444
[45] Date of Patent: Oct. 5, 1999

[54] CONTROL APPARATUS HAVING REMOTE PLC DEVICE AND CONTROL METHOD FOR SAME

[75] Inventors: Tatsuya Shidara; Akihiro Yamashita, both of Tokyo, Japan

[73] Assignee: Mitsubishi Denki Kabushiki Kaisha, Tokyo, Japan

[21] Appl. No.: 08/819,766

[22] Filed: Mar. 18, 1997

[30] Foreign Application Priority Data

Sep. 18, 1996 [JP] Japan ..................................... 8-246589

[51] Int. Cl.$^6$ ..................................................... G06F 19/00
[52] U.S. Cl. ................... 364/136; 364/131; 364/140.03; 364/434.11
[58] Field of Search ..................................... 364/130, 131, 364/136, 191, 434.11, 140.02, 140.06

[56] References Cited

U.S. PATENT DOCUMENTS

| | | | |
|---|---|---|---|
| 4,570,217 | 2/1986 | Allen et al. | 364/188 |
| 5,067,071 | 11/1991 | Schanin et al. | 395/275 |
| 5,504,801 | 4/1996 | Moser et al. | 375/29 |
| 5,513,095 | 4/1996 | Pajonk | 364/131 |

FOREIGN PATENT DOCUMENTS

| | | |
|---|---|---|
| 0037721 | 10/1981 | European Pat. Off. . |
| 0553349 | 8/1993 | European Pat. Off. . |
| 64-44509 | 2/1989 | Japan . |
| 3-102502 | 4/1991 | Japan . |
| 8-9200 | 1/1996 | Japan . |
| 2046476 | 11/1980 | United Kingdom . |
| 1603755 | 11/1981 | United Kingdom . |

*Primary Examiner*—Paul P. Gordon
*Attorney, Agent, or Firm*—Sughrue, Mion, Zinn, Macpeak & Seas, PLLC

[57] ABSTRACT

In a control apparatus including a main control section and a plurality of remote PLC devices each connected to the main control section, the main control section has a PLC computing unit controlling the entire system and a remote PLC communication control section executing data transaction via a communication line with the plurality of remote PLC devices, and each remote PLC device including a communication control section executing data transaction via a communication line with the main control section, a memory section for storing therein a sequence program transmitted through the communication line and specified to the remote PLC device, a machine input/output I/F section for executing data transaction with external machine controlled by the remote PLC device, and a PLC computing section for executing PLC processing according to a sequence program and based at least on data transmitted from the main control section and data obtained from the machine input/output I/F section.

16 Claims, 32 Drawing Sheets

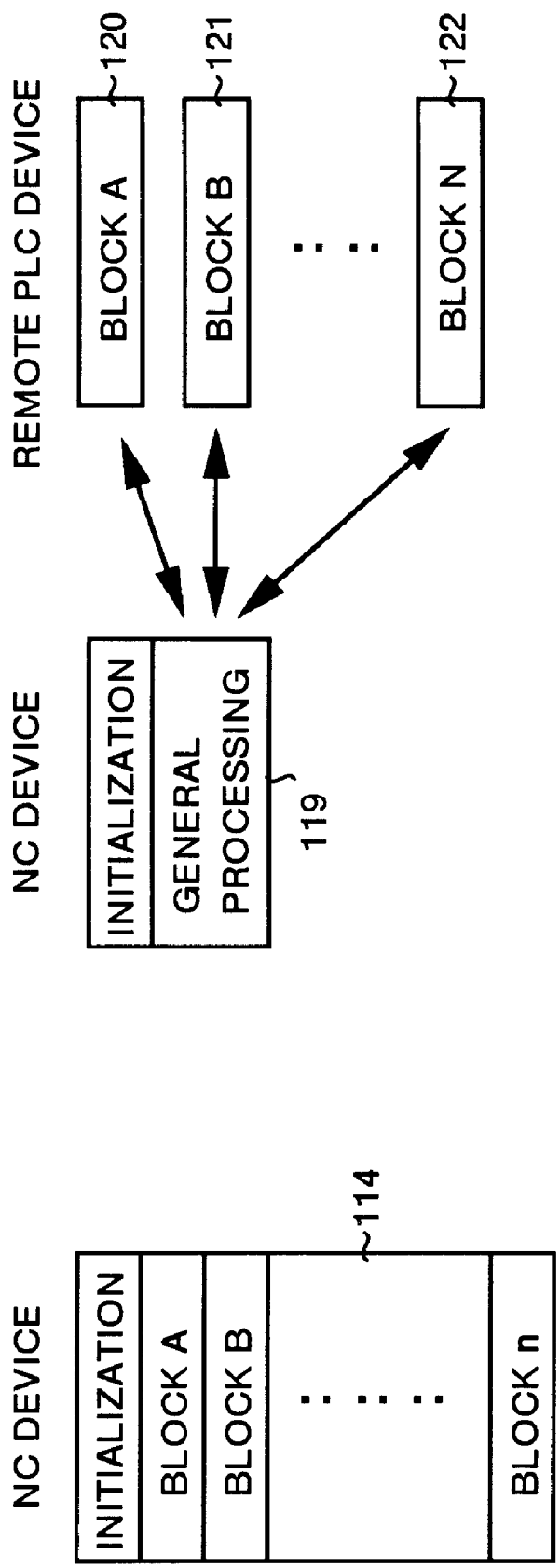

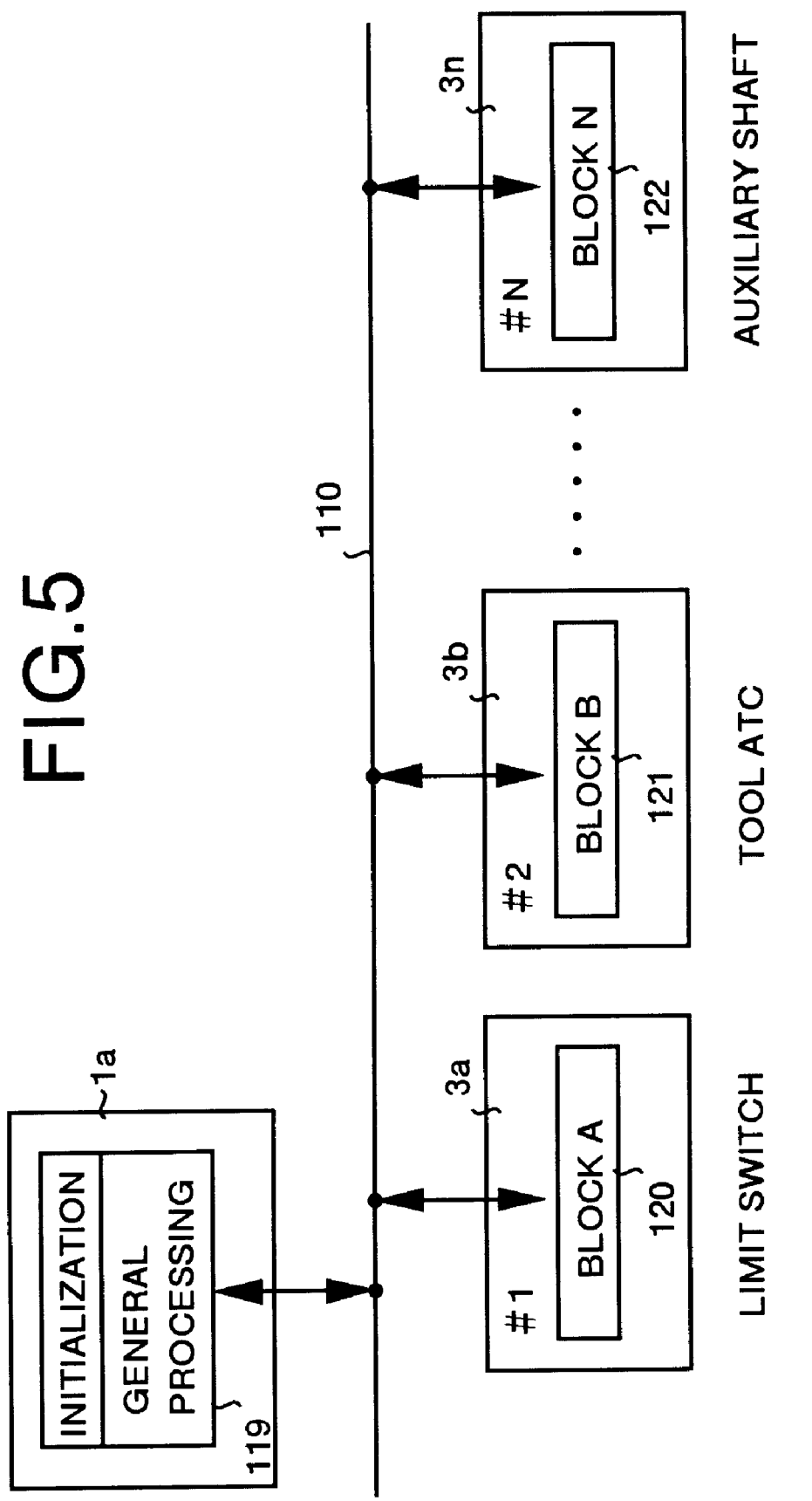

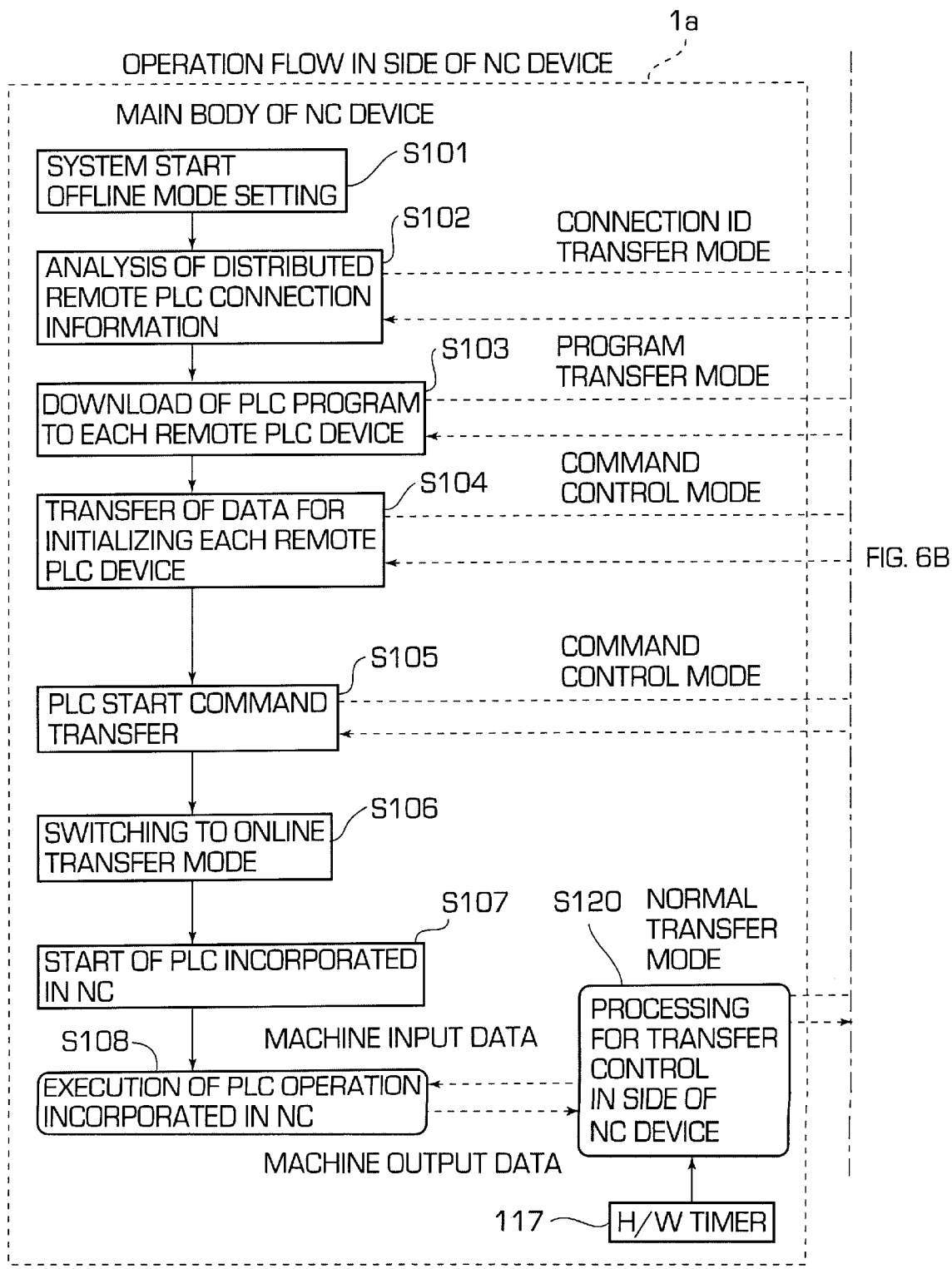

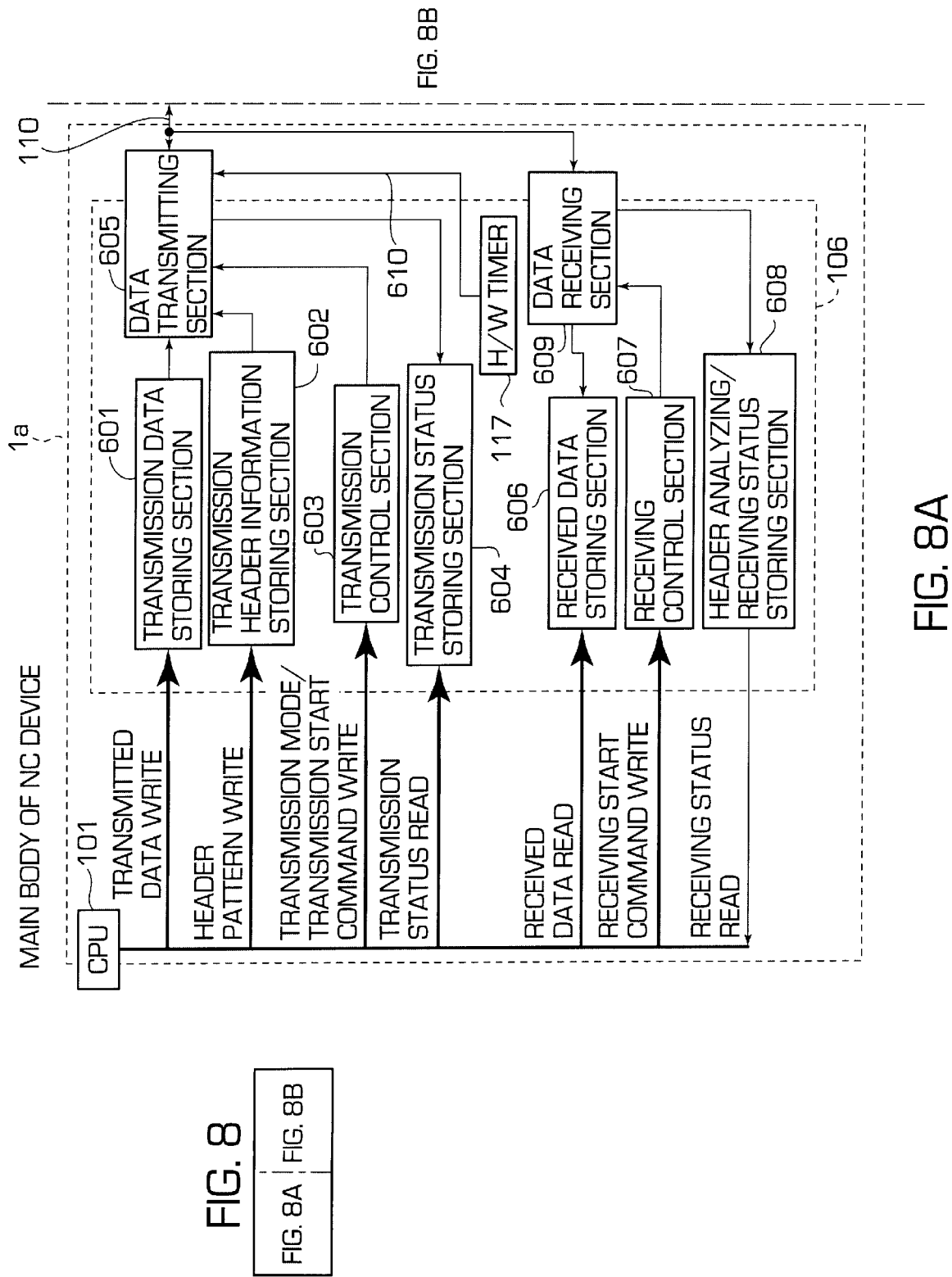

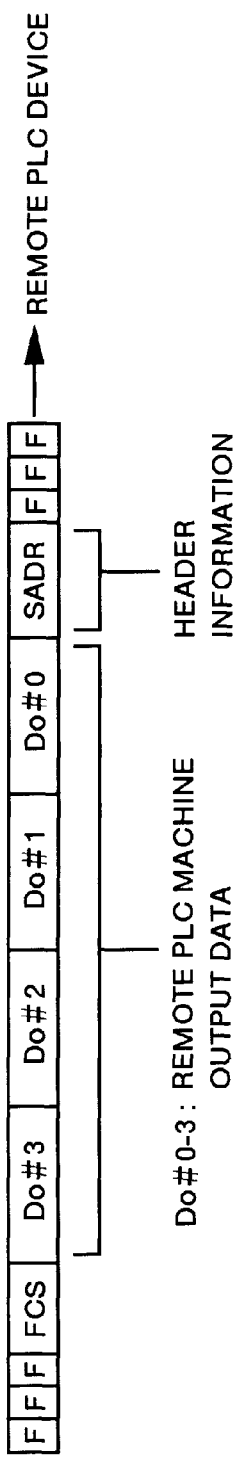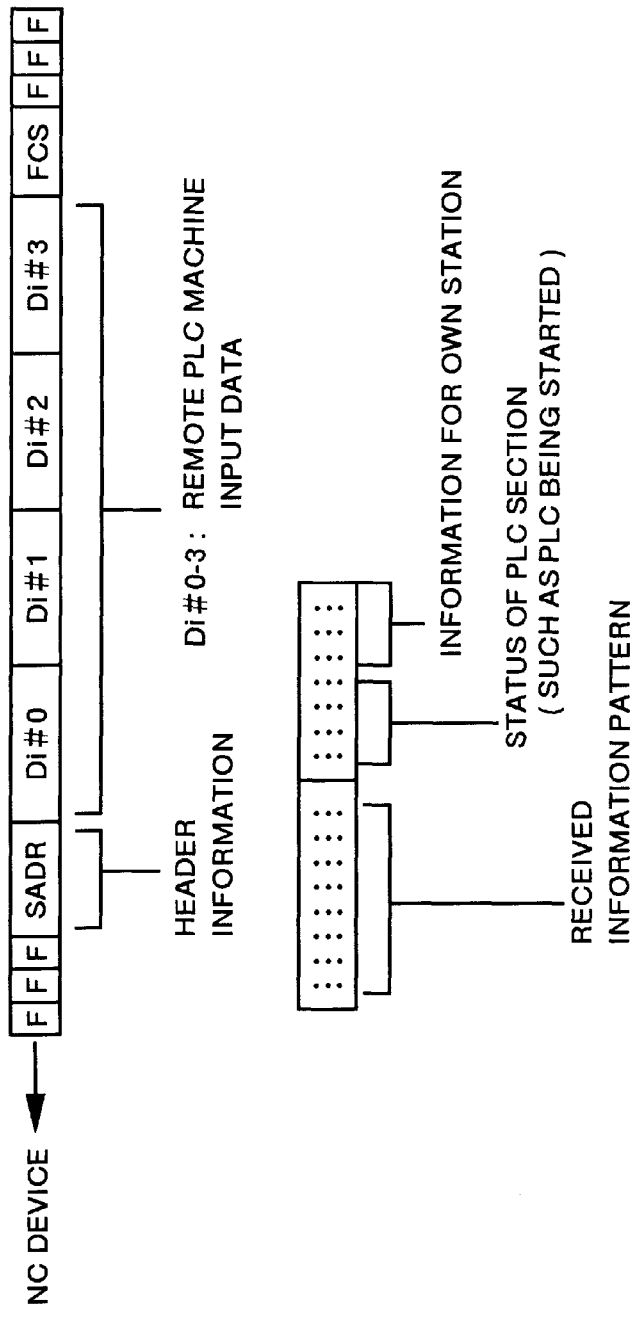
FIG.13A MACHINE OUTPUT TRANSFER FRAME
FIG.13B MACHINE INPUT TRANSFER FRAME

PROGRAM TRANSMISSION FRAME

PROGRAM TRANSMISSION RESPONSE FRAME

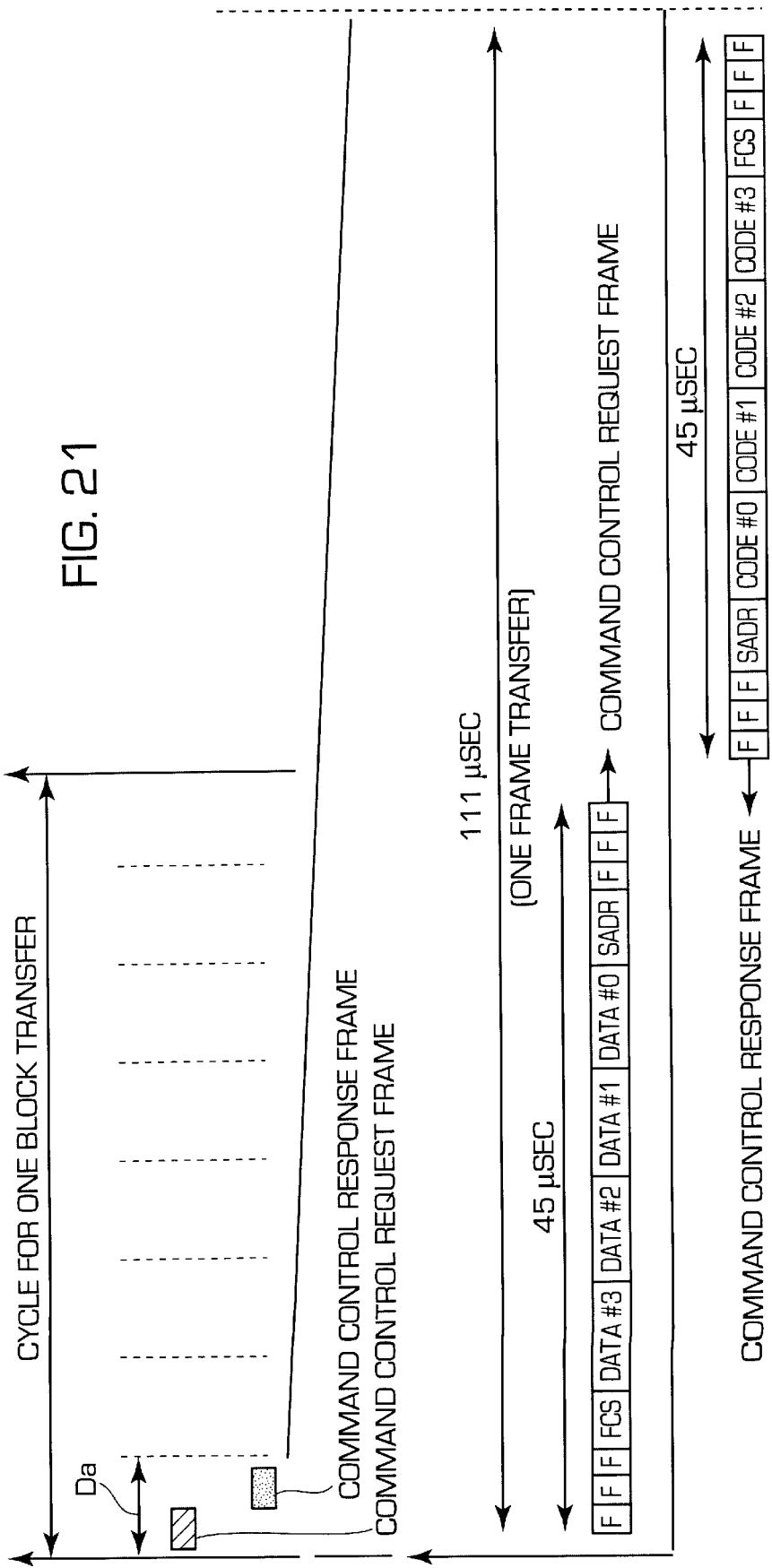

COMMAND CONTROL REQUEST FRAME

COMMAND CONTROL RESPONSE FRAME

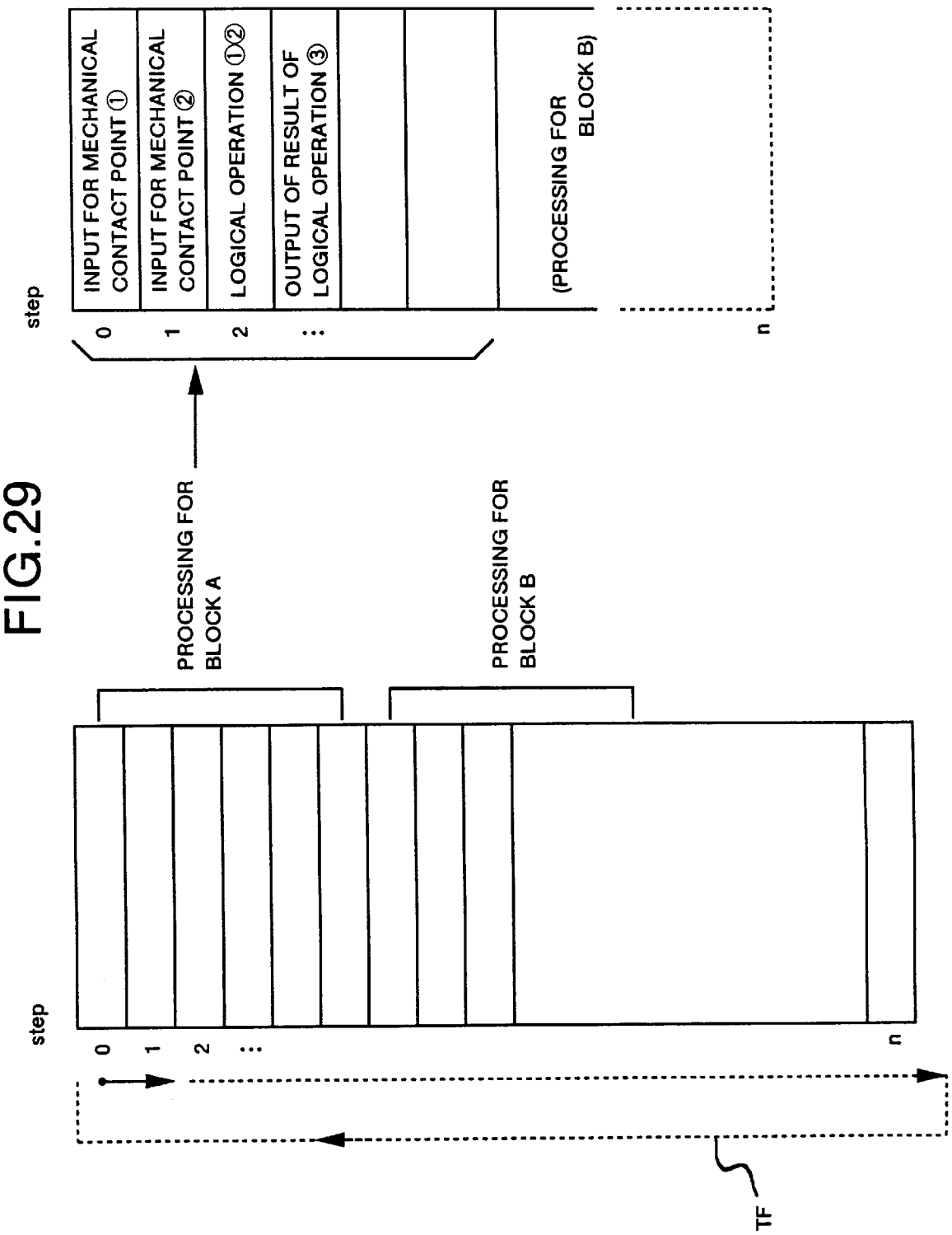

CONTROL APPARATUS HAVING REMOTE PLC DEVICE AND CONTROL METHOD FOR SAME

FIELD OF THE INVENTION

The present invention relates to a control apparatus having a remote PLC device and the control method, and more particularly to a control apparatus having a remote PLC device for data transaction with a distributed remote PLC device and the control method.

BACKGROUND OF THE INVENTION

Generally, in PLC processing for mechanically controlling a machine with a control apparatus, a large scale PLC processing program is written in a PLC computing unit incorporated inside a main body of the control apparatus, and the program is successively executed from its header. Then, the PLC computing unit successively executes such operations as reading contents of the program, executing a computing operation specified by the program using a machine input signal as an input data, and outputting the computed result as a machine output signal. The PLC computing unit executes a command for a final step in the program, then returns to the header of the program, and executes again the PLC processing program, thus a series of operations as described above being executed repeatedly.

Now detailed description is made for an example based on the conventional technology with reference to FIG. 26 to FIG. 29. FIG. 26 is a block diagram showing general configuration of a numerical control apparatus (described as NC device hereinafter) using distributed remote IO units, FIG. 27 is a block diagram showing general configuration of the distributed remote IO unit, FIG. 28 is a block diagram showing a flow of data for PLC processing in the remote IO unit, and FIG. 29 is an explanatory view showing a state in which the PLC processing program is executed.

In the figures, the same reference numerals indicate the same sections or the corresponding sections, and designated at the reference numeral 1 is a main body of an NC unit, at 2 a remote IO unit, at 4a a servo amplifier, at 4b a spindle amplifier, at 5a a driving section comprising a servo motor and an encoder, at 5b a driving section comprising a spindle motor and an encoder, at 101 a CPU for controlling the entire NC device, at 102 a RAM as an operation area in which the processing of the CPU 101 is executed, at 103 a ROM in which a control program for the CPU 101 is stored, at 104 a RAM for storing the PLC processing program, at 105 a PLC computing unit for executing mechanical control, at 107 a remote IO communication control section for inputting/outputting machine signals through communication, at 108 a servo/spindle communication control section for communicating with the servo amplifier 4a and the spindle amplifier 4b, at 109 a remote IO communication line between the remote IO unit 2 and the remote IO communication control section 107, at 111 a driving section communication line between the servo amplifier 4a, the spindle amplifier 4b, and the servo/spindle communication control section 108, at 112 a internal bus inside the main body of the NC device, at 113 a bit RAM for storing data for input to and output from a machine, at 119 data inputted from the machine (Di data), and at 120 data outputted to the machine (Do data).

Also designated at the reference numeral 18 is an NC communication control apparatus executing data transaction with the remote IO communication control section 107, at 19 a machine input/output I/F section executing data transaction with a machine, at Di1 machine input data inputted from the machine to the machine input/output I/F section 19, at Do1 machine output data outputted from the machine input/output I/F section 19 to the machine, at Di2 machine input data inputted from the NC communication control section 18 to the remote IO communication control section 107, and at Do2 machine output data outputted from the remote IO communication control section 107 to the NC communication control section 18.

Next description is made for operations. A large scale program for the PLC processing shown in FIG. 29 is stored in the RAM 104, and when the CPU 101 gives a command for starting execution of this program to the PLC computing unit 105, the PLC computing unit successively executes sequential processing (a processing flow TF in which processing is started from step 0 up to step n and returns again to step 0) from the header (step 0) of the program as shown in FIG. 29. An input data in this case is the machine input data (Di data) 119 stored in the bit RAM 113, and a result of computing is written in the area mapped in the output data section of the bit RAM 113 as machine output data (Do data).

On the other hand, the remote IO communication control section 107 fetches, independently from the PLC processing in the PLC computing unit 105, thereinto a portion of the machine output data 120 on the bit RAM 113 in a specified cycle and converts the data to serial data (Do2) to transmit the serial data to the remote IO unit 2 via the remote IO communication line 109.

The remote IO unit 2 receives this serial data in the NC communication control section 18 thereof and outputs a signal (Do1) from the machine input/output I/F section 19 to a machine as machine output data. On the other hand, when the machine input/output I/F section 19 receives a signal (Di1) from the machine, the remote IO unit 2 converts this data to serial data in the NC communication control section 18 thereof, and transmits the data to the remote IO communication control section 107 via the remote IO communication line 109. Then the transmitted data is stored in the bit RAM 113 as machine input data (Di data).

As described above, the PLC computing unit 105 reads machine input data stored in the bit RAM 113 according to the program stored in the RAM 104, executes a computing operation, and writes a result of the computing operation in the bit RAM 113 as machine output data. On the other hand, transaction of machine input/output data is cyclically executed between the bit RAM 113 as well as remote IO communication control section 107 in the main body 1 of the NC device 1 and the remote IO unit 2 through communications. Then operations described above are repeatedly executed.

In the numerical control apparatus having a PLC computing unit based on the conventional technology, the PLC computing unit in the main body 1 of the NC device successively executes PLC processing according to a PLC processing program stored in the main body 1 of the NC device. However, in this PLC processing, the entire sequence of all the system operations has to be executed according to one program (normally, a cycle time (scan time) required for executing this sequence program is in a range from a couple of ms to tens of ms) even in a case where the CPU 101 either executes the processing with software or has a dedicated PLC computing unit, so that the processing speed becomes slower as a scale of the program becomes larger, and for this reason, a period of time required for scanning the program for the PLC processing becomes longer as the machine system becomes more complicated and the number of steps in a program increases.

For instance, in a program for executing an logical operation for data for mechanical contact points 1 and 2 inputted in block A in FIG. 29 and outputting a result of the logical operation as a signal 3, a processing cycle for executing this block A is decided by the number of steps for the whole PLC processing program. Namely, assuming that input for the mechanical contact point 1 is turned on in step 0 and input for the mechanical contact point 2 is turned on during execution of the processing in step 3, a signal indicating turn ON of input for this mechanical contact point 2 is detected after the PLC computing unit 105 executes a last step (step n) of the PLC processing program, returns again to the header of the program and executes the command for step 1, so that a response time until the signal 3 indicating a result of the logical operation is turned on is equivalent in the worst case to a scan time for the PLC processing program.

To reduce this scan time, it is required to improve the performance of the PLC operation itself for executing the PLC processing program, which makes the system very expensive.

An example of configuration of a PLC device for processing input/output signals requiring a high-speed processing is disclosed in Japanese Patent Laid-Open Publication No. SHO 64-44509, and the device disclosed herein comprises a module for processing signals each not requiring a high-speed processing and a module for processing signals each requiring a high-speed processing, and the modules can be selected according to a speed required for processing each signal. However, employment of the configuration described above makes the system configuration more complicated, reliability of the system lower, and more expensive.

Furthermore, in the system using distributed remote IO units, machine input data (Di2) is transferred to the main body 1 of the NC device through the remote IO communication line 109 each time, so that, even in a case where machine input data requiring a high-speed processing is generated (for instance, in a case where an output signal to stop the machine has to be transmitted according to the input signal from a limit switch), the processing can not be executed at a speed higher than a transferring speed to the main body 1 of the NC device, so that the machine may disadvantageously overrun before the stop signal is actually issued.

SUMMARY OF THE INVENTION

It is an object of the present invention to provide a control apparatus having a remote PLC device in which data transfer between the main body of a control apparatus and a remote IO unit is not restricted by computing performance of the PLC computing apparatus in the main body of the control apparatus, nor by transferring capability of a communication line, and the control method.

In a control apparatus having a remote PLC device according to the present invention having a main control section and a plurality of remote PLC devices connected via a communication line to this main control section, the main control section comprises a PLC computing unit for managing an entire system comprising this main control section and the plurality of remote PLC devices, and a remote PLC communication control section for executing data transaction through the communication line with the plurality of remote PLC devices; and the remote PLC device comprises a communication control section for executing data transaction via the communication line with the main control section, a memory section for storing therein a sequence program transmitted via the communication line and specified to the system, a machine input/output I/F section for executing data transaction with an external machine controlled by the system, a PLC computing section for executing PLC processing with the sequence program according to at least data transmitted from the main control section and data obtained from the machine input/output I/F section.

The main control section makes each of the remote PLC devices repeatedly execute the PLC processing according to the sequence program specified to the device, and also executes cyclic data transaction with the remote PLC device with a cycle not dependent on operations of a CPU of the main control section.

Data transfer between the main control section and the remote PLC device is executed with a data frame, and this data frame contains at least header information indicating a station number and a transaction state of the remote PLC device and data for the external machine driven by the remote PLC device.

A plurality of remote I/O units each having a communication control section for executing data transaction via a communication line and a machine input/output I/F section for executing data transaction with an external machine controlled by the system are connected to the communication line to which the main control section and the plurality of remote PLC devices are connected; and data transfer between the main control section, the remote PLC devices, and the remote I/O units is executed with data frames each having identical frame length.

The header information contains data for downloading a specified sequence program to the specified remote PLC device.

Additionally header information contains data for initialization of the remote PLC device and information for starting and stopping when sent from the main control section to the remote PLC device, and also contains information concerning an operating state of the remote PLC device when sent from the remote PLC device to the main control section.

The remote PLC device executes the PLC processing by using data subjected to the PLC processing by the remote PLC device as well as data subjected to the PLC processing by other remote PLC device.

The remote PLC device can select any of data subjected to the PLC operation by the remote PLC device, data from the main control section, data inputted from the external machine, and data maintained in the remote PLC device by specifying the number of bits for each command code.

The remote PLC device is allocated to each function or to each device.

In a method of controlling with a control apparatus having a remote PLC device, said control apparatus comprising a main control section and a plurality of remote PLC devices each connected via a communication line to this main control section, the main control section fetches the number of units of the plurality of remote PLC devices, ID numbers for the remote PLC devices, switch information or the like in an offline transfer mode, downloads a sequence program previously set in the specified remote PLC device, initializes the specified remote PLC device, gives an instruction for start of PLC processing to the specified remote PLC device; and the remote PLC device repeats execution of the PLC processing for data specified according to a sequence program specified to the remote PLC device until it receives a stop command from the main control section, and executes cyclic data transaction between the main control section and the remote PLC device with a cycle not dependent on operations of a CPU of the main control section.

Data transfer between the main control section and the remote PLC device is executed with a data frame, and this data frame contains at least header information indicating a station number and a transaction state of the remote PLC device and data for the external machine driven by the remote PLC device.

The header information contains data for downloading a specified sequence program to the specified remote PLC device.

The header information contains data for initialization of the remote PLC device and information for starting and stopping when sent from the main control section to the remote PLC device, and also contains information concerning an operating state of the remote PLC device when sent from the remote PLC device to the main control section.

Other objects and features of this invention will become understood from the following description with reference to the accompanying drawings.

BRIEF DESCRIPTION OF THE DRAWINGS

FIGS. 4A and 4B are explanatory views showing a PLC processing programs for a remote PLC device according to Embodiment 1 of the present invention;

FIG. 5 is an explanatory view of PLC distributed processing with a remote PLC device according to Embodiment 1 of the present invention;

FIGS. 13A and 13B are explanatory views showing a format of a transfer data frame in the machine input/output side in the normal transfer mode between the main body of an NC device and the remote PLC device according to Embodiment 2 of the present invention;

FIG. 21 is an explanatory view showing a timing for transfer in the command control mode between a main body of an NC device and a remote PLC device according to Embodiment 4 of the present invention;

FIG. 29 is an explanatory view showing a state of execution of a PLC processing program based on the conventional technology.

DESCRIPTION OF THE PREFERRED EMBODIMENTS

Figure 1:
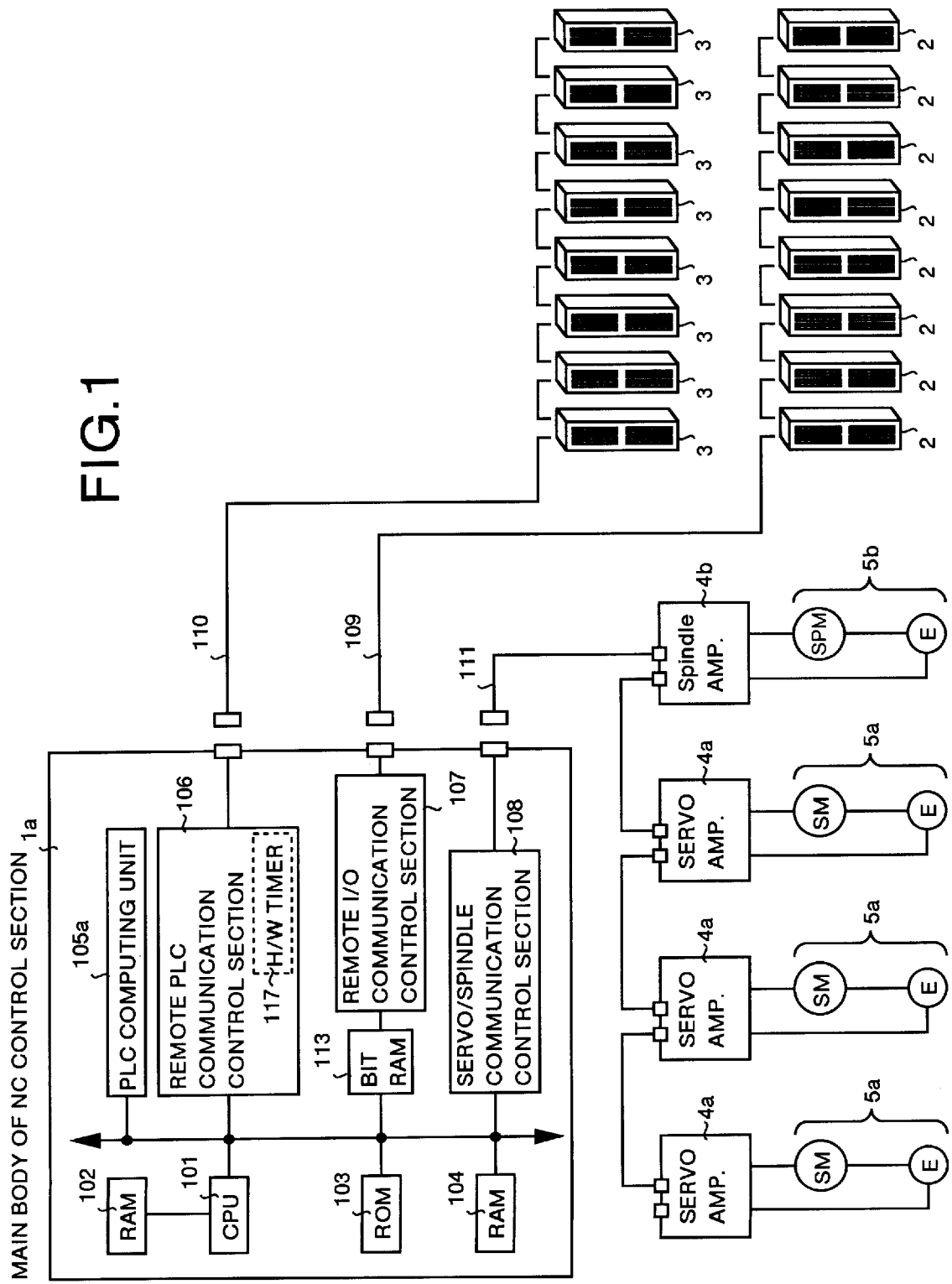
FIG. 1 is a block diagram showing general configuration of an entire system of an NC device having a remote PLC device according to Embodiment 1 of the present invention.
Figure 2:
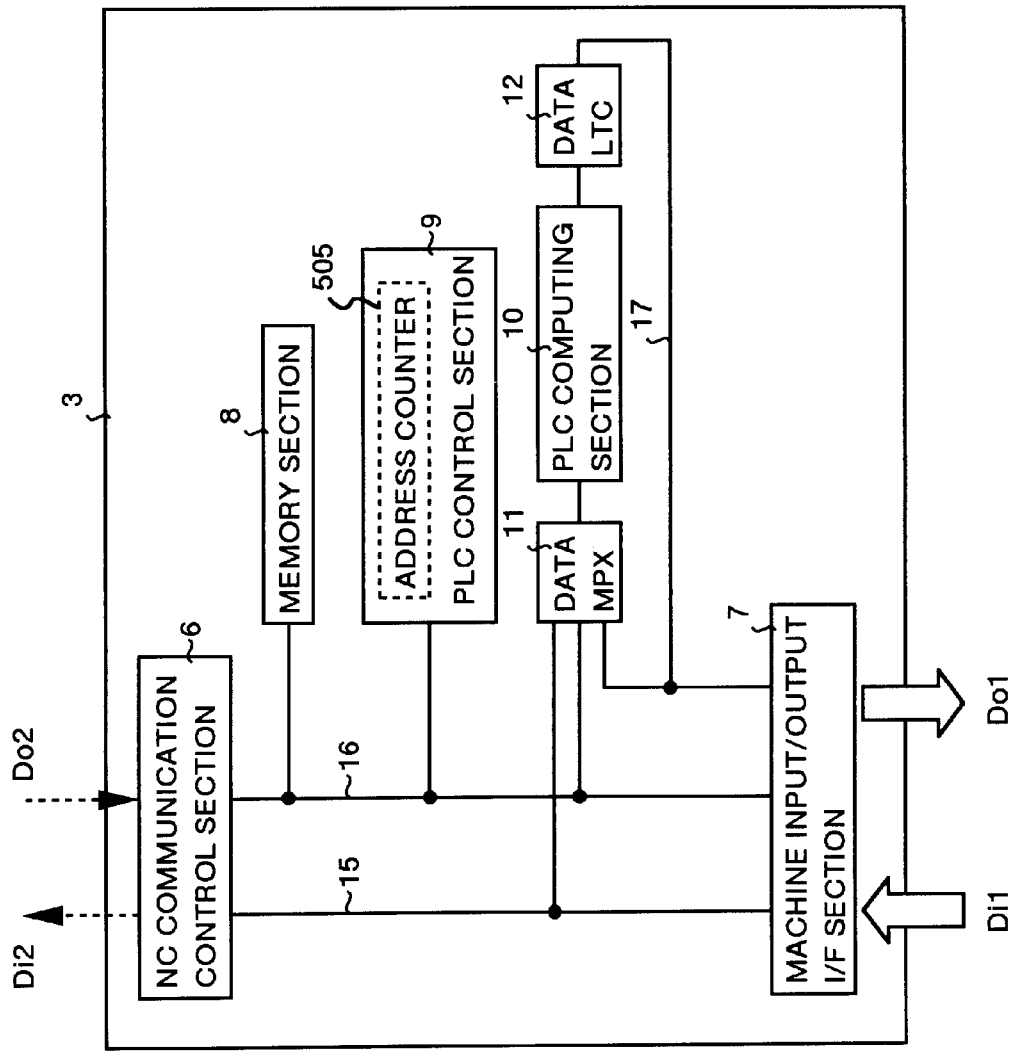
FIG. 2 is a block diagram showing general configuration of a remote PLC device according to Embodiment 1 of the present invention.
Figure 3:
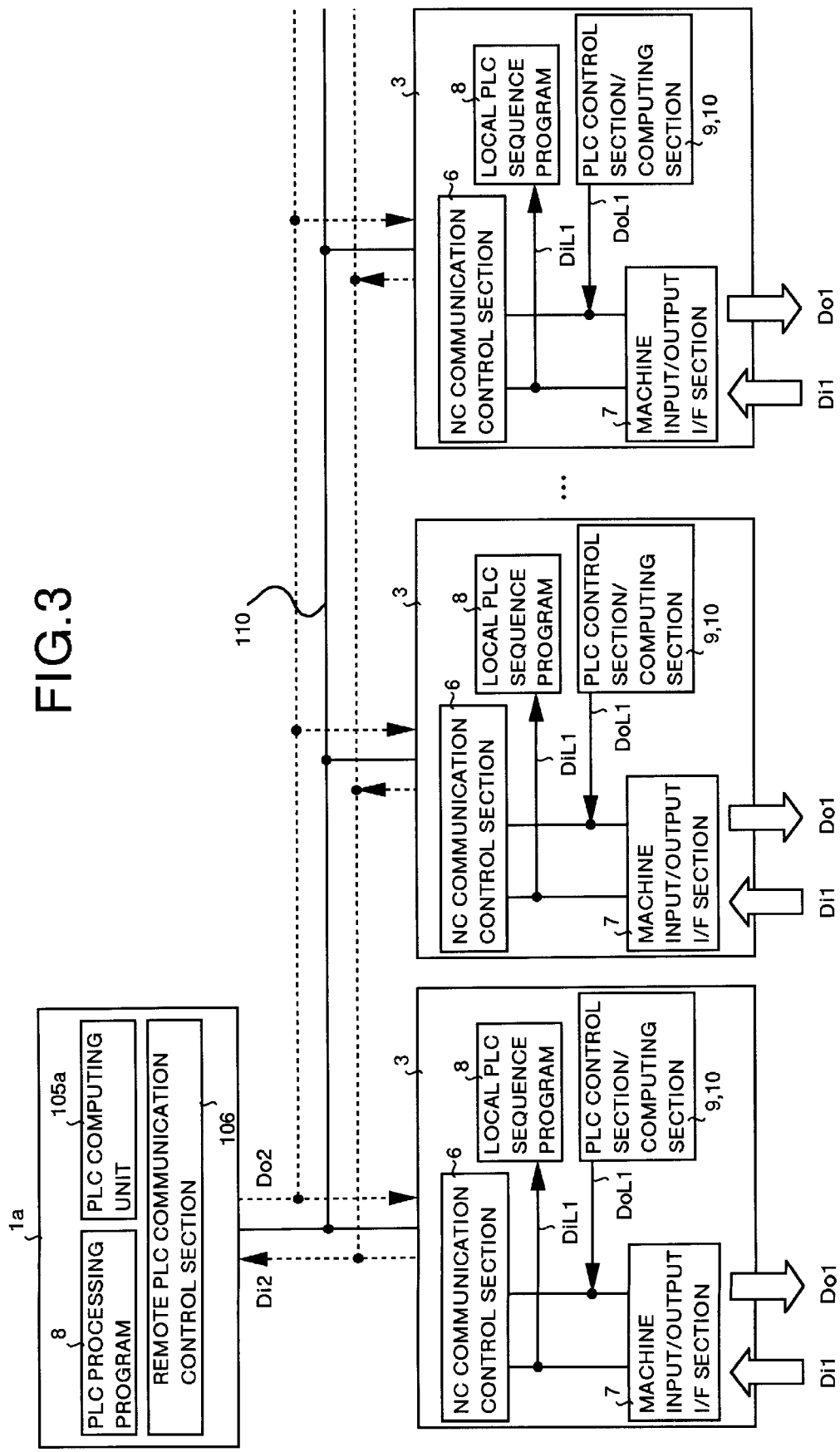
FIG. 3 is an explanatory view showing a flow of PLC processing data in a remote PLC device according to Embodiment 1 of the present invention.
Figure 6B:
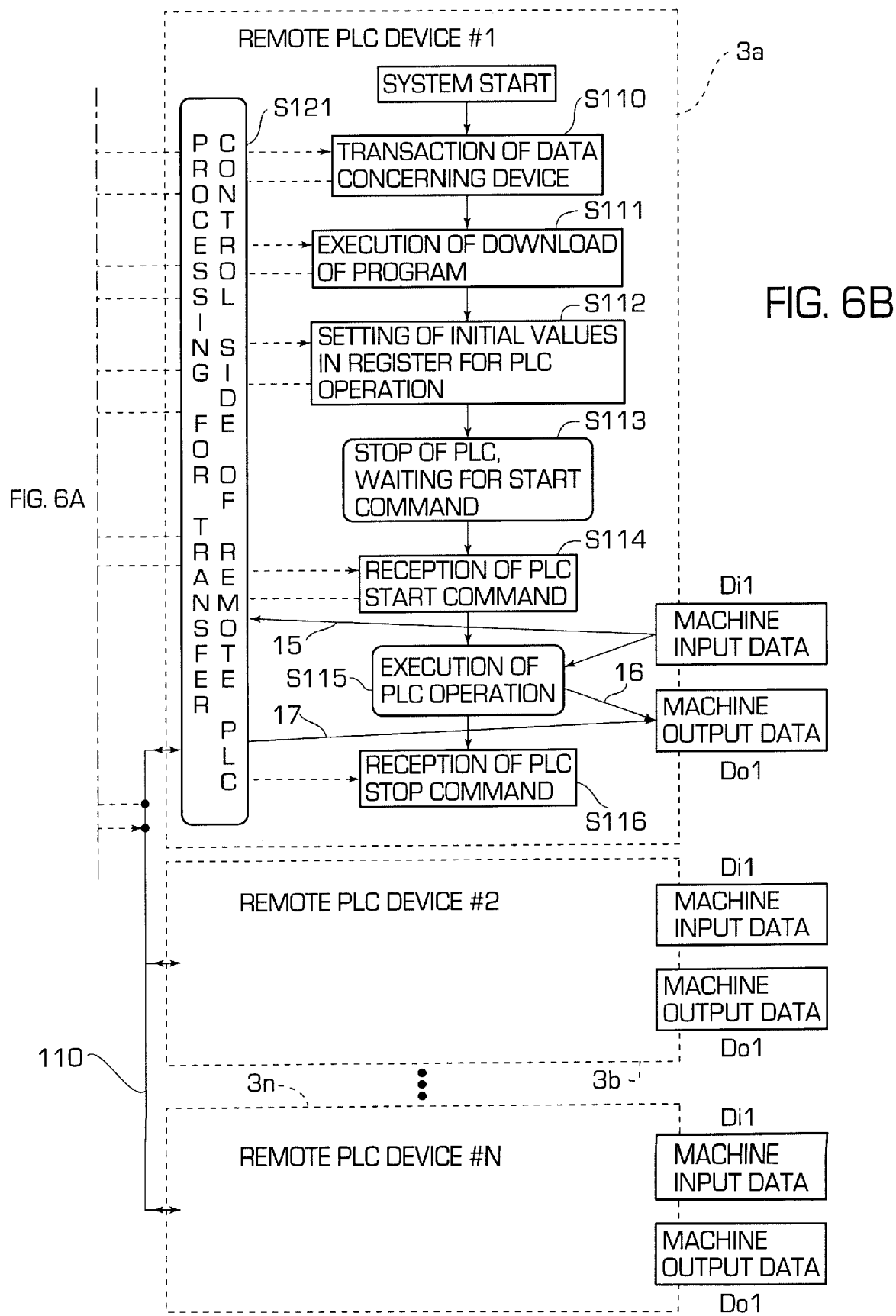
FIG. 6 is an explanatory view showing a main body of an NC device according to Embodiment 1 of the present invention and an operation flow in internal processing by a remote PLC device.
Figure 7:
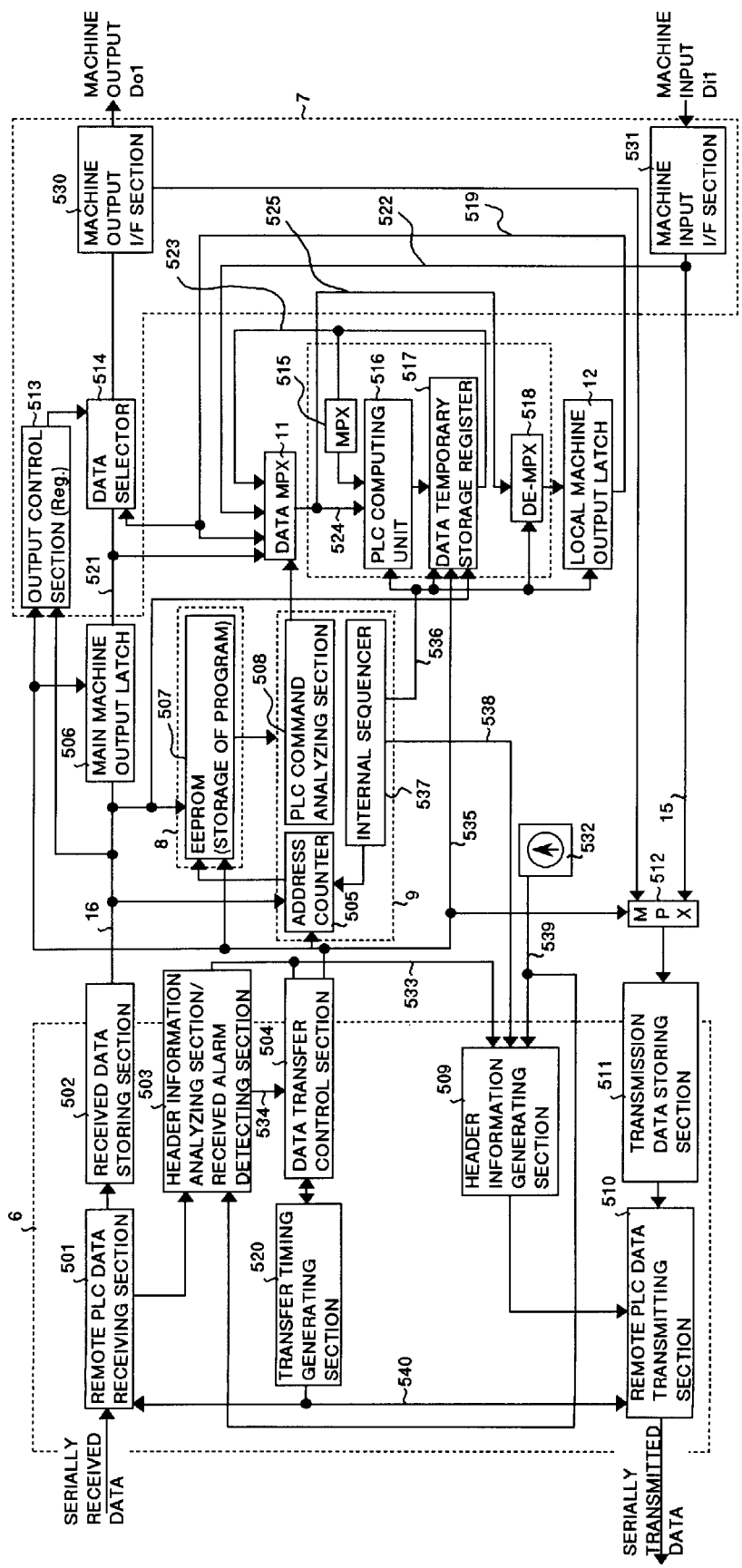
FIG. 7 is a block diagram showing in detail the internal configuration of a remote PLC device according to Embodiments 1 and 5 of the present invention.

Description is made for Embodiment 1 of the present invention with reference to FIG. 1 to FIG. 7. FIG. 1 is a block diagram showing general configuration of the system of an NC unit having remote PLC devices, FIG. 2 is a block diagram showing schematic configuration of a distributed remote PLC device, FIG. 3 is an explanatory view showing a flow of data for the PLC processing executed by the remote PLC device, FIGS. 4A and 4B are explanatory views showing a program of the PLC processing executed by the remote PLC device, FIG. 5 is an explanatory view showing PLC distributed processing executed by the remote PLC device, FIG. 6 is an explanatory view showing operation flows each of the internal processing in the main body of the NC device as well as in the remote PLC device respectively, and FIG. 7 is a block diagram showing the details on internal configuration of the remote PLC device.

In the figures, the same reference numerals indicate the same sections as the sections corresponding to those in the example based on the conventional technology, and designated at the reference numeral 1a is a main body of the NC device, at 105a a PLC computing unit, at 106 a remote PLC communication control section, at 3 a distributed remote PLC device, at 117 a H/W timer, at 110 a remote PLC communication line between the remote PLC communication control section 106 and the distributed remote PLC device 3, at 6 is an NC communication control section in the distributed remote PLC device 3, at 7 a machine input/output I/F section in the distributed remote PLC device 3, at 8 a memory section, at 9 a PLC control section, at 10 a PLC computing section, at 11 a data multiplexer (data MPX), at 12 a local machine output latch (data LTC), at 15 a machine input data bus, at 16 a received data bus, and at 17 a local machine output bus.

Also, designated at the reference numeral at 119 is a program for whole processing of the PLC executed by the PLC computing unit 105a in the main body 1a of the NC device, at 120 a program for processing of the block A executed by a distributed remote PLC device (#1) 3a, at 121 a program for processing of the block B executed by a distributed remote PLC device (#2) 3b, and at 122 a program for processing of the block N executed by a distributed remote PLC device (#n) 3n.

Next description is made for operations according to the operating flow shown in FIG. 6. When an operation of the system is started in the main body 1a of the NC device, the remote PLC communication control section 106 sets a remote PLC transfer mode to an offline transfer mode controlled by the CPU 101 as a default value (processing S101). Then the CPU 101 sends out a transfer frame in the connection ID transfer mode to the remote PLC communication line 110 to know how many units of distributed remote PLC devices 3 are connected to the remote PLC connection line 110 (processing S102).

Each of the distributed remote PLC devices 3 receives this transfer frame in each of the NC communication control section 6 thereof respectively to analyze the header information of the frame, and when the ID number is identical to the self ID number preset by the switch or the like, a frame containing therein ID information and switch information each specific to each of the distributed remote PLC devices 3 is sent to the main body 1a of the NC device (processing S110). Then, the main body 1a of the NC device analyzes the switch information from each of the distributed remote PLC devices 3 received by the remote PLC communication control section 106, and downloads the sequence program preset in the ROM 103 or in the RAM 104 to the specified distributed remote PLC device 3 if necessary (processing S103 and processing S111).

Herein, the transferred sequence program is written in the memory section 8 of the distributed remote PLC device 3 according to a procedure of the program transfer mode described in detail in Embodiment 3 described later.

When setting of the sequence program is finished, the CPU 101 in the main body 1a of the NC device transfers data for initialization to each of the distributed remote PLC devices 3 (processing S104 and processing S112). The transferring procedure is executed herein by transferring the required data to the distributed remote PLC device 3 according to the sequence of a command control mode described in detail in Embodiment 4 described later. Contents of the data includes a value for an address counter 505 in the sequence program included in the PLC control section 9 as well as a default value for a PLC temporary storage register 517 or the like.

When setting for each environmental condition is complete, the distributed remote PLC device 3 becomes ready for starting the PLC (processing S113).

Then the main body 1a of the NC device sends a frame containing a command for starting the PLC processing in a command control mode to make each of the distributed remote PLC devices 3 execute the PLC processing according to the sequence program downloaded in the memory section 8 (processing S105).

When each of the distributed PLC devices receives this command, the distributed remote PLC device 3 reads the command instructed by the address counter 505 in the PLC control section 9 from the memory section 8, and then successively executes logical operations for the instructed data by the PLC computing section 10 according to the sequence program stored in the memory section 8 (processing S114 and processing S115).

Herein, by making this sequence program that specified to the PLC processing, the PLC processing can independently be executed by the distributed remote PLC device 3 by itself without transferring machine data to the main body 1a of the NC device and without any processing through the PLC computing unit 105a of the main body 1a of the NC device. For instance, when machine input data (Di1) inputted from the machine input/output I/F section 7 is changed, processing for outputting machine output data (Do1) from the machine input/output I/F section 7 may be executed. A data flow in this step is in the following order: machine input data (Di1)→the machine input/output I/F section 7→the machine input data bus 15→data multiplexer (data MPX) 11→the PLC computing section 10→the local machine output latch (data LTC) 12→the local machine output bus 17→the machine input/output I/F section 7→machine output data (Do1).

The distributed remote PLC device 3 repeats the PLC processing for each of the devices until it receives a stop command for the PLC from the main body 1a of the NC device. Even in a case where the PLC computing section 10 is operated, the distributed remote PLC device 3 cyclically executes operations of transmitting machine input data as well as of receiving machine output data from the main body 1a of the NC device in the machine input/output I/F section 7 and the NC communication control section 6 thereof like in the remote IO based on the conventional technology.

A flow of the data in this step is as follows. Namely, a machine input signal (Di1) is inputted from the machine input/output I/F section 7, and a data frame containing therein the machine input data is transmitted to the remote PLC communication line 110 through the machine input data bus 15 as well as through the NC communication control section 6 (processing S121). Then, the main body 1a of the NC device receives this data with the processing for NC transfer control (processing S120) in the remote PLC communication control section 106, outputs the machine input data to the internal bus 112 of the main body 1a of the NC device, and executes PLC operation by the CPU 101 or the PLC computing unit 105a (processing S108).

While the machine output data obtained as a result is transmitted as a data frame from the remote PLC communication control section 106 to the remote PLC communication line 110 through the internal bus 112 (processing S120). Then the NC communication control section 6 of the distributed remote PLC device 3 receives this frame (processing S121), and outputs the received frame to external devices through the received data bus 16 and the machine input/output I/F section 7 as a machine output signal (Do1).

On the other hand, the main body 1a of the NC device sends a start command to the distributed remote PLC device 3, then switches an operating mode to the normal transfer mode (an online transfer mode), and executes a cyclic data transaction between the NC device and the distributed remote PLC device 3 without being dependent on operations of the CPU 101 according to a H/W timer 117 incorporated in the remote PLC communication control section 106 (processing S120).

Data transacted in the normal transfer mode is, as described in detail in Embodiment 2 described later and also as in the case where the remote IO device based on the conventional technology is connected, machine input data (Di2) inputted mainly by each of the distributed remote PLC devices 3 and machine output data (Do2) to each of the distributed remote PLC devices 3 processed by the PLC computing unit 105a, and each of these data is processed by the CPU 101 or the PLC computing unit 105a (processing S108).

Each of the distributed remote PLC devices 3 connected to the remote PLC communication line 110 executes operations, as described above in detail, according to the operation flow shown in FIG. 6.

FIGS. 4A and 4B and FIG. 5 show an example of a PLC program allocated to one discrete function, and a block A processing program 120, a block B processing program 121, and a block N processing program 122 are previously downloaded to each of the distributed remote PLC devices 3 with the method described above. Then, a program 119 for the entire PLC processing executed by the PLC computing unit 105a in the main body 1a of the NC device is started, a start command is transmitted to each of the distributed remote PLC devices 3 in the initialization routine, thus execution of operations by the distributed remote PLC devices 3 each connected to the remote PLC communication line 110 and the PLC processing of the entire system being managed in the general processing routine.

On the other hand, each of the distributed remote PLC devices 3 receives this start command, and then executes the already downloaded block A processing program 120, block B processing program 121 and block N processing program 122.

FIG. 5 shows a case where a plurality of distributed remote PLC devices 3 are functionally distributed and each of the distributed devices processes each of the programs, and also shows a case where a distributed remote PLC device (#1) 3a is used for control of a limit switch, a distributed remote PLC device (#2) 3b is used for control of a machining tool ATC (automatic tool exchange), and a distributed remote PLC device (#N) 3n is used for control of an auxiliary shaft respectively.

Also FIG. 7 shows in further detail the internal configuration of the distributed remote PLC device 3 shown in FIG. 2, and it is also possible to realize this configuration with one unit of LSI. Herein, an EEPROM 507 is used for the memory section 8, but a SRAM or a flash ROM may be used therefor.

In FIG. 7, designated at the reference numeral 501 is a data receiving section, at 502 a received data storing section, at 503 a header information analyzing section/a received alarm detecting section, at 504 a data transfer control section, at 505 an address counter, at 506 a main machine output latch, at 507 an EEPROM, at 508 a PLC command analyzing section, at 509 a header information generating section, at 510 a remote PLC data transmitting section, at 511 a transmission data storing section, at 512 a transmission data multiplexer (MPX), at 513 a machine output control register (Reg), at 514 a machine output data selector, at 515 a temporarily maintained data multiplexer (MPX), at 516 a PLC computing unit, at 517 a data temporary storage register, at 518 a bit position selecting circuit (DE-MPX) of machine output data, and at 519 an external machine output data bus.

Also in the figure, designated at the reference numeral 520 is a transfer timing generating section, at 521 a main machine output data bus, at 522 a local machine output data bus, at 523 an internally and temporarily maintained data bus, at 524 a bit computation source data, at 525 a local machine output latch data, at 530 an external machine output I/F section, at 531 an external machine input I/F section, at 532 a station number select switch, at 533 an error detecting signal bus, at 534 a signal for operation information, at 535 a data transfer control bus, at 536 a PLC control bus, at 537 an internal sequencer for PLC control, at 538 a PLC operation status, at 539 a station number information, and at 540 a remote PLC side transmission start signal.

As described in detail above, the main body 1a of the NC device analyzes specific ID information and switch information each obtained from each of the distributed remote PLC devices 3 respectively by the connection ID transfer mode at first in an offline transfer mode, then in a connection ID transfer mode, recognizes any distributed remote PLC device 3 for an object, and downloads a specific sequence program to each of the specified distributed remote PLC devices 3. Then the main body 1a thereof transfers required data for initialization to each of the distributed remote PLC devices 3, and makes each of the distributed remote PLC devices 3 start execution of the PLC in the command control mode in order to make it execute the PLC processing according to each sequence program respectively. On other hand, each of the distributed remote PLC devices 3 repeats execution of the PLC processing allocated to the device according to the sequence programs for the device until the device receives a PLC stop command from the main body 1a of the NC device, and at the same time cyclically executes operations of transmitting machine input data as well as of receiving machine output data.

Also the main body 1a of the NC device sends out a start command to each of the distributed remote PLC devices 3, then executes cyclic data transaction with each of the distributed remote PLC devices 3 without being dependent on operations of the CPU 101 in the normal transfer mode (an online transfer mode) according to the H/W timer 117. As described above, a general processing program 119 for the PLC processing executed by the main body 1a of the NC device transmits a start command to each of the distributed remote PLC devices 3 in the initialization routine, and execution of the distributed remote PLC devices 3 and PLC processing of the entire system are managed in the general processing routine.

Accordingly, with this embodiment, a plurality of distributed remote PLC devices 3 are provided and connected through the remote PLC communication line 110 to one unit of main body 1a of the NC device, so that the PLC computing section 10 incorporated in each of the distributed remote PLC devices 3 executes PLC processing specific to the distributed remote PLC device 3, and the PLC computing unit 105a in the main body 1a of the NC device only executes start, stop, and initialization of operations of the PLC computing sections 10 incorporated in a plurality of the distributed remote PLC devices 3 respectively and manages the PLC processing for the entire system, which makes it possible to reduce a work load to the PLC computing unit 105a in the main body 1a of the NC device.

Also, the distributed remote PLC devices 3 are allocated to functional devices respectively, and the PLC program optimized to each of the devices is downloaded, so that a plurality of PLC processing can be executed in parallel by enhancing independency of each functional device, and the processing for the previously specified machine input/output is discretely executed without communicating with the main body 1a of the NC device, which makes it possible to improve a processing speed or a response speed.

The number of distributed remote PLC devices 3 each connected to the remote PLC communication line 110 can be changed according to a load of the PLC processing, which makes it possible to construct an optimal NC control system from the view points of price as well as of performance thereof.

A specific sequence program is downloaded to each of the plurality of distributed remote PLC devices 3 respectively from one unit of main body 1a of the NC device through the remote PLC communication line 110, so that it is possible to change the sequence program for each of the distributed remote PLC devices 3 with one operation from the main body 1a of the NC device, and also sequence programs for the plurality of distributed remote PLC devices 3 can uniformly be managed by the main body 1a of the NC device, which makes it possible to improve operability and adaptability for maintenance of the NC control system.

Also internal setting of and starting/stopping control for each of the plurality of distributed remote PLC devices 3 are possible from one unit of main body 1a of the NC device through the remote PLC communication line 110, so that a processor and a control program specific to controlling inside of the distributed remote PLC devices 3 are not required, and for this reason a low price NC control system can be constructed and also system management is simplified.

The main body 1a of the NC device transfers required input/output data independently from the PLC operation by each of the distributed remote PLC device 3, so that compatibility of software with the remote IO unit 2 based on the conventional technology can be retained and performance of the NC control system can be improved only by replacing the remote IO unit 2 with the distributed remote PLC device 3.

In the PLC processing by the distributed remote PLC device 3, in addition to machine data inputted or outputted inside the distributed type of remote device 3, also data inputted through the remote PLC communication line 110 can be treated, so that it is possible to equivalently execute logical operations for data for all machines handled by the NC control system, and a speed of PLC processing in the entire NC control system can be improved by parallelly executing the PLC for each of the machines.

By realizing configuration of the distributed remote PLC devices with one chip of LSI, a low price and small size device can be obtained. Also by realizing the memory section with an EEPROM 507, it is not necessary to download a sequence program each time system operation is started, which makes it possible to obtain an efficient NC control system.

Furthermore, the distributed type of remote PLC device 3 can be located at any site away from the main body 1a of the NC device, and improvement of functions can easily be realized by connecting a plurality of distributed remote PLC devices 3 to a remote PLC communication line 110 with serial communication, which makes it possible to rewrite a sequence program to other one as well as to monitor an operation state in each of the devices other than data transfer.

Figures 8A, 8B:
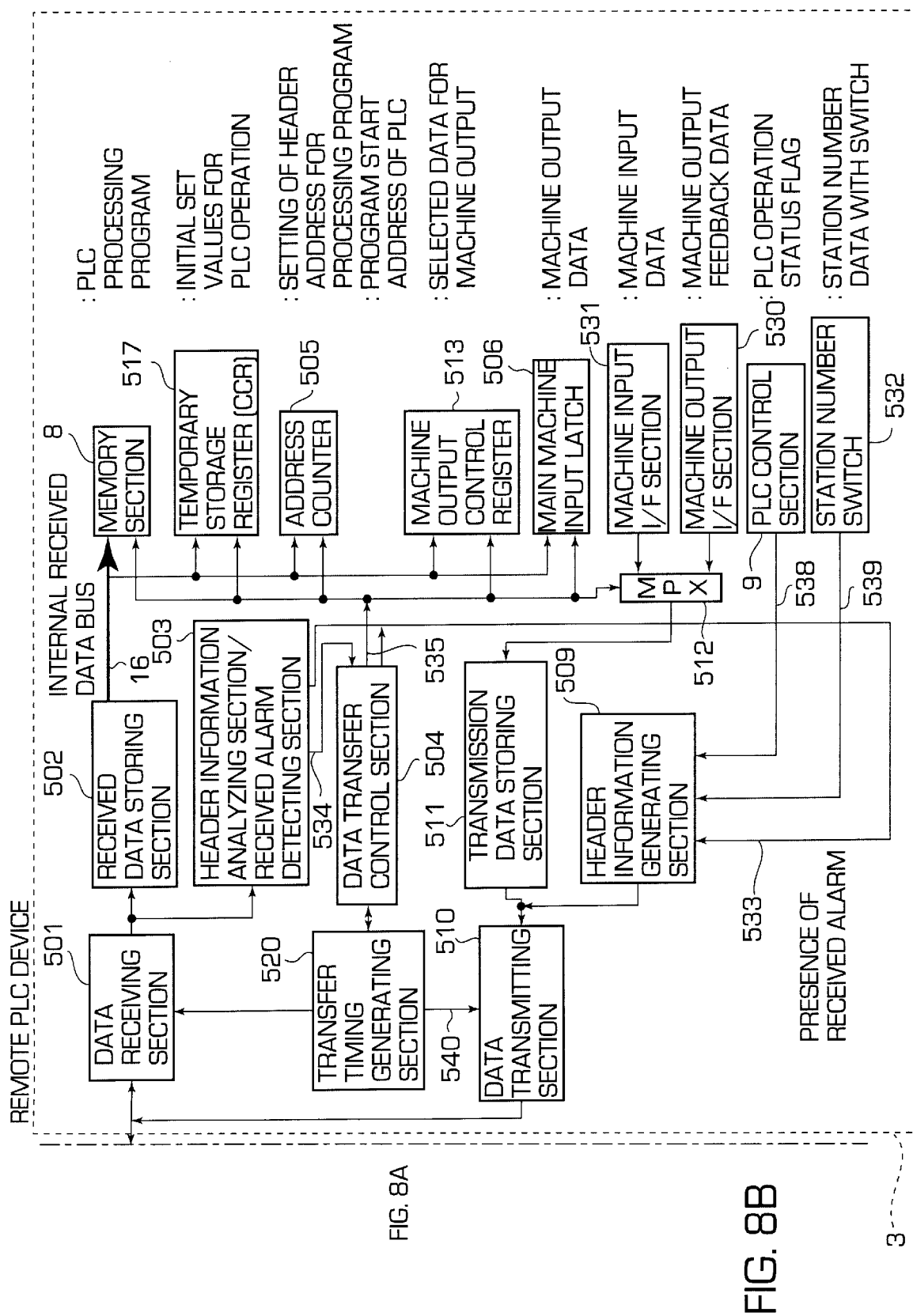
FIG. 8 is a block diagram showing a flow of data transacted between a main body of an NC device and a remote PLC device according to Embodiments 2, 3, and 4 of the present invention.

Description is made for control in a case where data transaction is executed in the normal transfer mode between the main body 1a of the NC device and the distributed remote PLC device 3 according to Embodiment 2 of the present invention with reference to FIG. 8 to FIG. 14. FIG. 8 is a block diagram showing a flow of data transaction between the main body 1a of the NC device and the distributed remote PLC device 3, FIGS. 9A and 9B are flow charts showing processing for data transfer in the normal transfer mode between the main body 1a of the NC device and the distributed remote PLC device 3, FIG. 9A shows the flow chart in the main body 1a of the NC device, and FIG. 9B shows that in the distributed remote PLC device 3.

Figure 10:
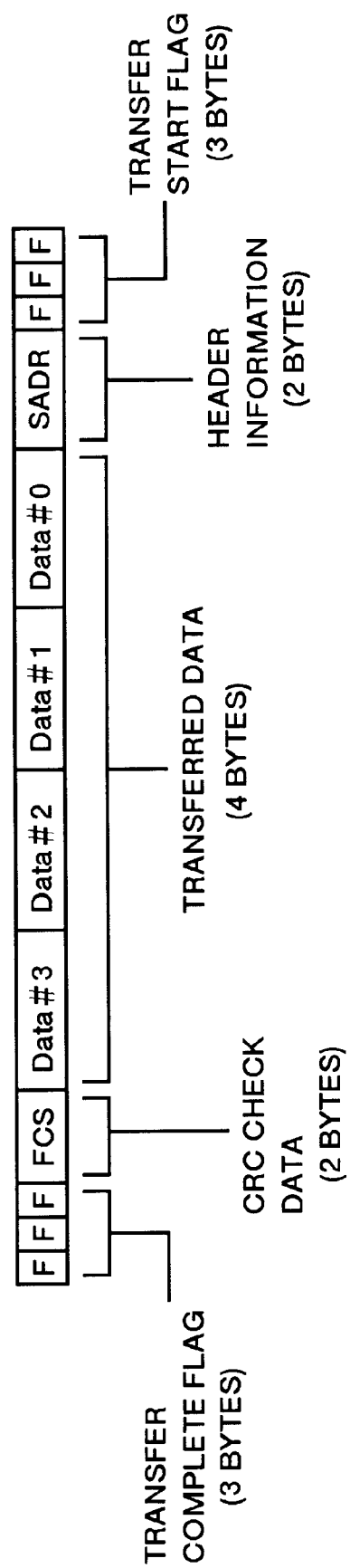
FIG. 10 is an explanatory view showing a format of a transfer data frame in the normal transfer mode between a main body of NC device and a remote PLC device according to Embodiment 2 of the present invention.
Figure 11:
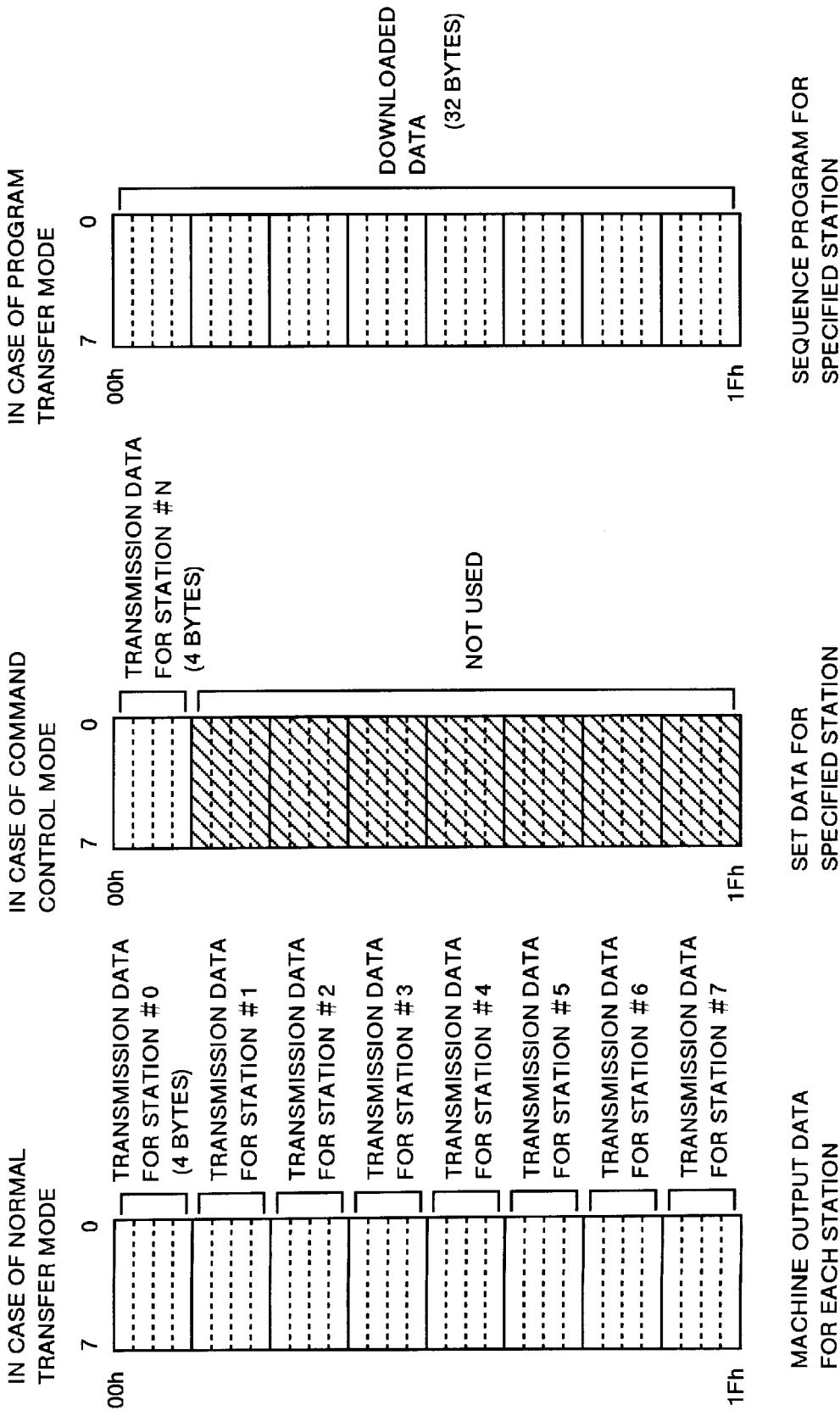
FIGS. 11A, 11B, 11C are explanatory views showing data setting in a transmission data storing section (601) in the normal transfer mode according to Embodiments 2, 3, and 4 of the present invention.
Figure 12:
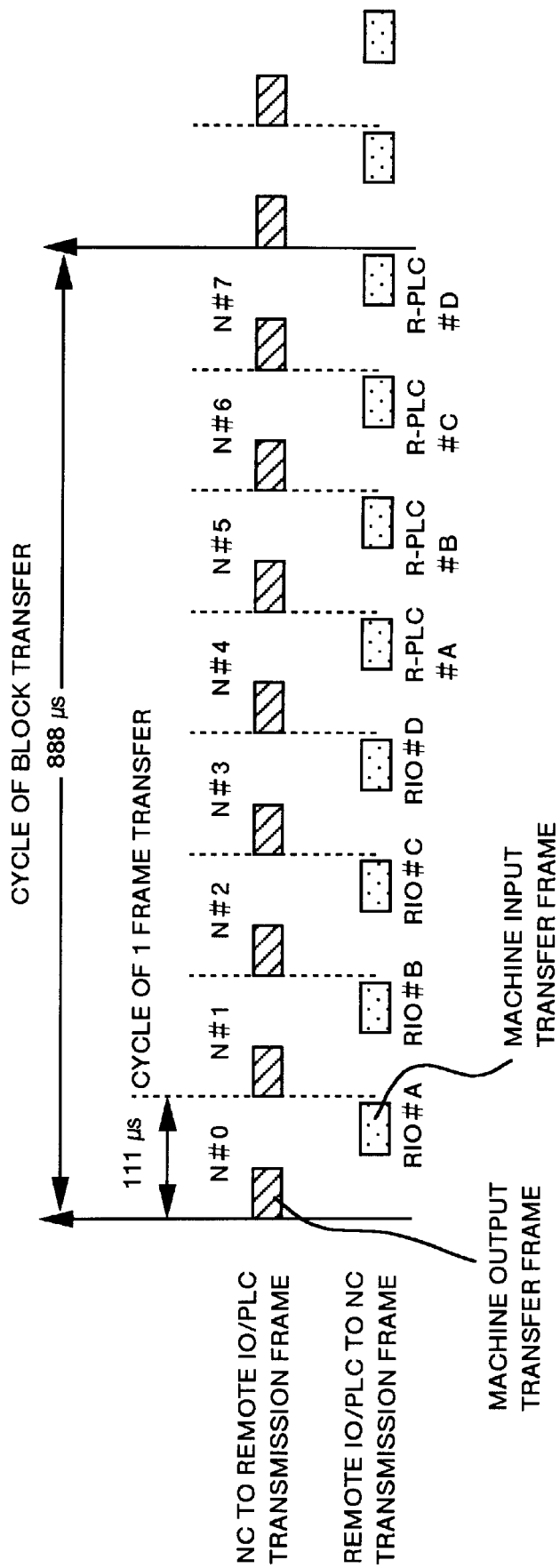
FIG. 12 is an explanatory view showing a timing for transfer in the normal transfer mode between a main body of an NC device and a remote PLC device according to Embodiment 2 of the present invention.
Figure 14:
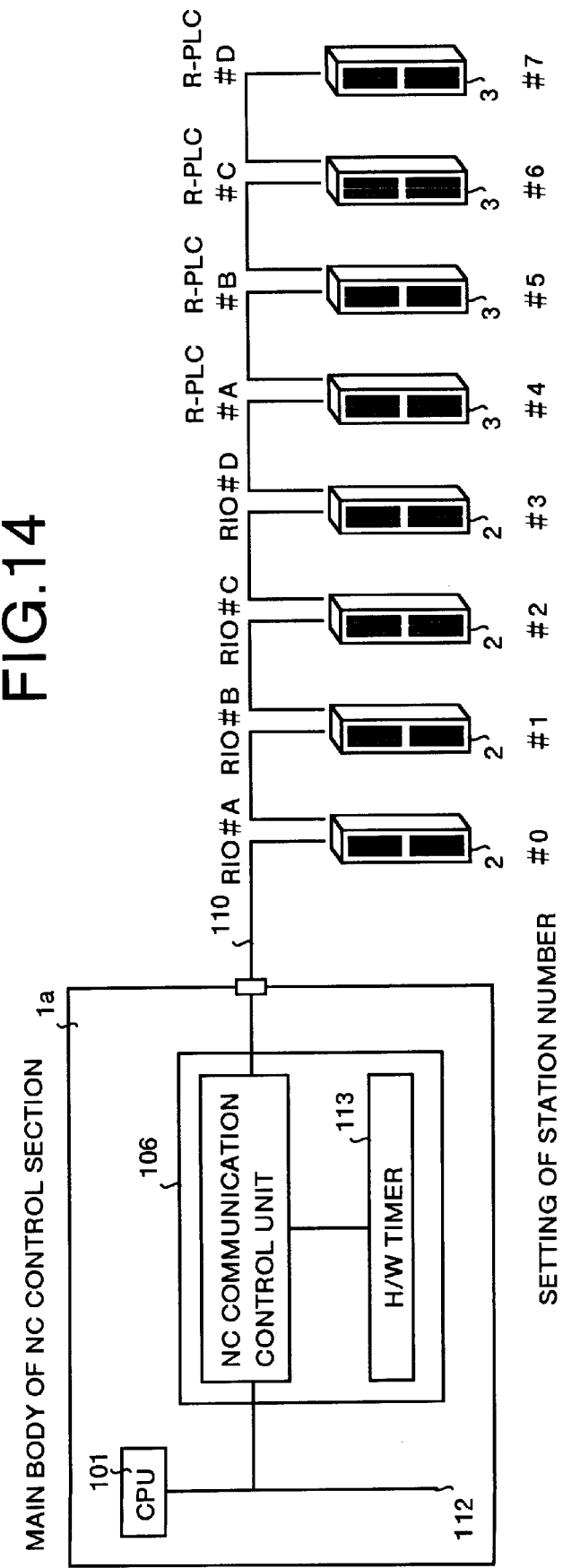
FIG. 14 is a block diagram showing connection of a remote I/O device and a remote PLC device from the main body of the NC device to a remote PLC communication line according to Embodiments 2, 3 and 4 of the present invention.

Also, FIG. 10 is an explanatory view showing format of a transfer data frame in the normal transfer mode between the main body 1a of the NC device and the distributed remote PLC device 3, FIGS. 11A to 11C are explanatory views showing data setting in a transmission data storing section 601 in the normal transfer mode, FIG. 12 is an explanatory view showing a transfer timing in the normal transfer mode between the main body 1a of the NC device and the distributed remote PLC device 3, FIGS. 13A and 13B are explanatory views showing formats of a machine output side transfer data frame FIG. 13A as well as of a machine input side transfer data frame FIG. 13B each in the normal transfer mode between the main body 1a of the NC device and the distributed remote PLC device 3, and FIG. 14 is a block diagram showing connection of the remote IO units 2 and the distributed remote PLC devices 3 each to the identical remote PLC communication line 110 from the main body 1a of the NC device.

In the figures, the same reference numerals are assigned to the same sections as or the sections corresponding to those in the example based on the conventional technology as well as in Embodiment 1, and designated at the reference numeral 601 is a transmission data storing section, at 602 a transmission header information storing section, at 603 a transmission control section, at 604 a transmission status storing section, at 605 is a data transmitting section, at 606 a received data storing section, at 607 a receiving control section, at 608 a header analyzing/received status storing section, at 609 a data receiving section, and at 610 an NC side transmission start signal.

Figure 9A:
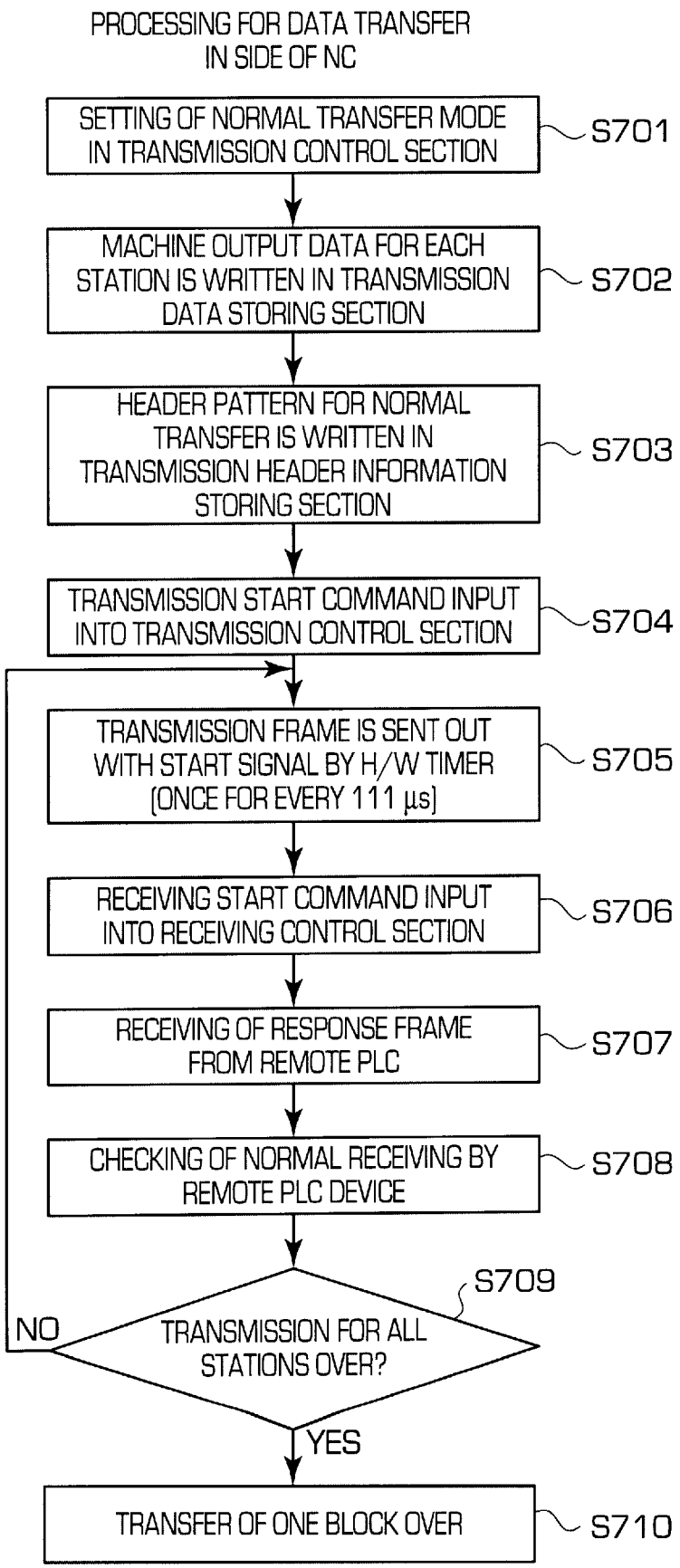
FIGS. 9A and 9B are flow charts showing a main body of the main frame of NC device according to Embodiment 2 of the present invention and data transfer processing in the normal transfer mode with a remote PLC device.
Figure 9B:
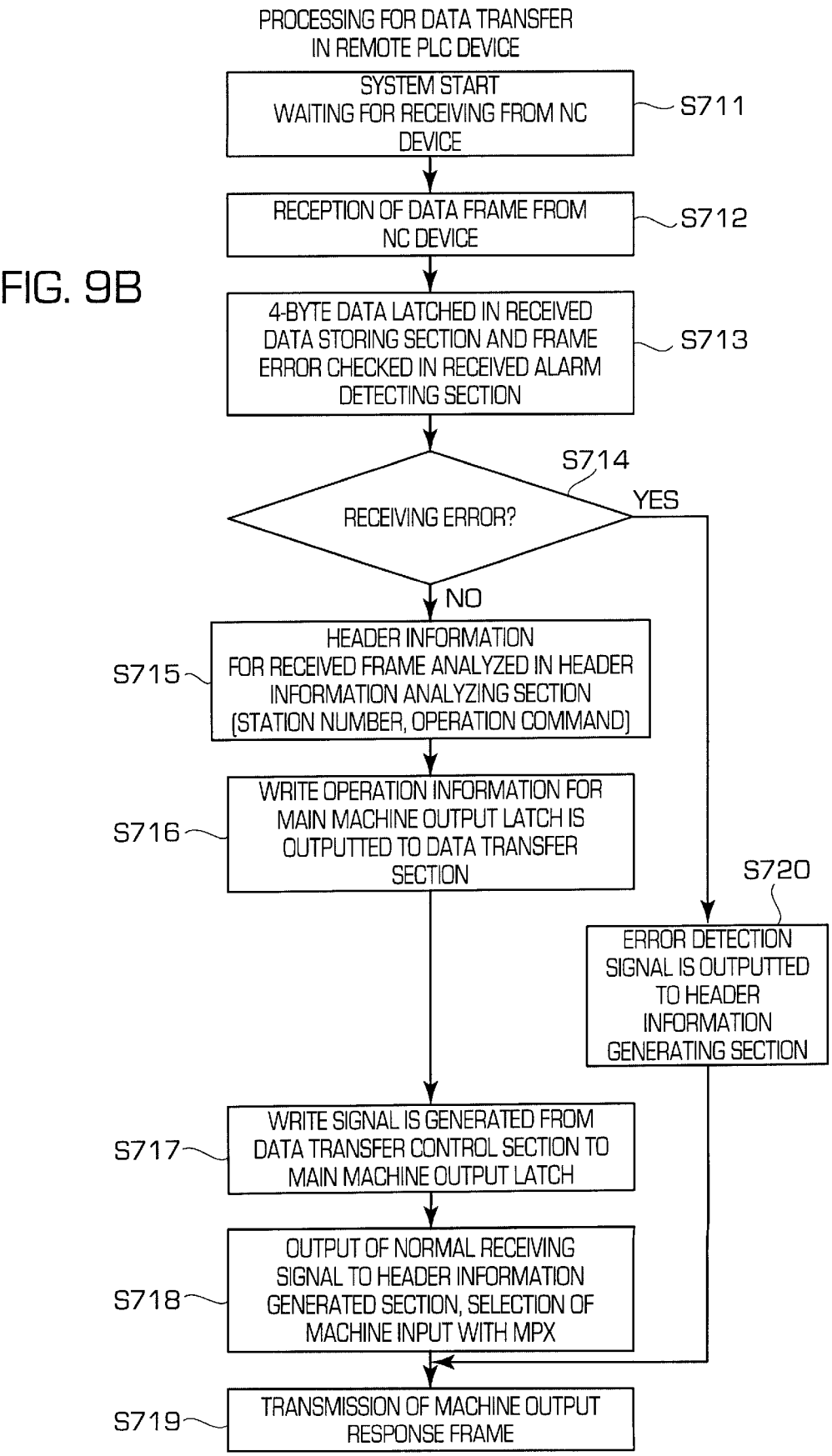

Next description is made for operations according to the flow chart shown in FIGS. 9A and 9B. Herein, assuming that the number of devices each connected to the remote PLC communication line 110 is at maximum 8 stations and data required for one station is 4 bytes, a buffer size of 32 bytes is selected for transmitted data storing section 601. In a case where data transaction is executed in the normal transfer mode between the main body 1a of the NC device and the distributed remote PLC device 3, at first, the CPU 101 sets the normal transfer mode in the transmission control section 603 (step S701). Then the CPU 101 sets 4-byte machine output data to be transferred to each of the distributed remote PLC devices 3 in the transmitted data storing section 601 as shown in FIG. 11A.

Then, the CPU 101 writes data indicating the previously specified normal transfer mode in the transmission header information storing section 602 as a header pattern. This header pattern is decided as 2-byte data like "FF0n" as indicated by "SADR (header information)" shown in FIG. 10 and FIGS. 13A and 13B, and for instance, in a case where a data frame is to be transferred to a device #0 among the plurality of distributed remote PLC devices 3, data of "FF00" is written in the transmission header information storing section 602 (step S703). Then the CPU 101 writes data indicating transmission start in the transmission control section 603. For the operation described above, a method of writing the data in the previously specified register may be used (step S704).

Herein description is made for examples of header patterns. In a case of a machine output side transfer data frame FIG. 13A, "SADR" is "FF0n" when a command is successfully received, wherein the reference code n indicates station numbers of the devices 0 to 7. Also in a case of a machine input side transfer data frame FIG. 13B, "SADR" is "520n" when data is successfully received, while "SADR" is "450n" when data is erroneously received. Similarly, the reference code n indicates station numbers of the devices 0 to 7. For instance, if data is successfully received, the PLC is not started, and a station number of the device is set to 0 with the header information set to "5200".

Then, when the data transmitting section 605 receives a command for transmission-start, it adds first 4-byte data (transfer data (Data #0 to Data #3) shown in FIG. 10) in the transmission data storing section 601, a header pattern (the header information (SADR) shown in FIG. 10) in the transmission header information storing section 602, and 2-byte CRC check data obtained by logical operation (for instance, data is computed according to a 16-bit frame detecting sequence defined in the JIS X5104 frame detecting sequence section) from these data described above to the transfer data frame (the CRC check data (FCS) shown in FIG. 10).

Then the data transmitting section 605 adds thereto a 3-byte transfer start flag (a transfer start flag (FFF) shown in FIG. 10) for determination of the transfer data made by the receiving side and a 3-byte transfer completion flag (a transfer completion flag (FFF) shown in FIG. 10) as given data for determination made by the receiving side that the transfer frame is finished, and generates the machine output transfer frame shown in FIG. 13A. Also, when a transmission start signal 610 for the H/W timer 117 is generated, the data transmitting section transmits data to the remote PLC communication line 110 (step S705). After the transmission of the data, the data transmitting section writes a receiving start command in the receiving control section 607 and waits for receiving data from each of the distributed remote PLC devices 3.

On the other hand, the data receiving section 501 in the distributed remote PLC device 3 receives the transmitted frame, and the received data storing section 502 latches the data for this frame, and the header information for this frame is received by the header information analyzing section/received alarm detecting section 503 (steps S711, S712). Then, the header information analyzing section/received alarm detecting section 503 checks any error according to the CRC, and outputs an error detection signal to the header information generating section 509 through the error detection signal bus 533 if any reception error is detected (steps S713, S714).

If any error is not detected when the data is received, the header information analyzing section/received alarm detecting section 503 analyzes the header information (step S715), and outputs an operational information signal 534 to the data transfer control section 504 (step S716). In this embodiment, the operational information signal is a signal indicating the fact that transfer data (Data #0 to Data #3) in the transfer data frame shown in FIG. 10 is written in the main machine output latch 506, and contents of the data is output data to the machine connected to the distributed remote PLC device 3.

Then, the data transfer control section 504 receives this operational information signal 534 to output a write effective signal to the main machine output latch 506 through the data transfer control bus 535, and writes the data for the received data storing section 502 in the main machine output latch 506 through the received data bus 16 (step S717).

The data transfer control section 504 output a signal indicating that the data was successfully received and the receiving operation was complete to the header information generating section 509, and in order to transmit machine input data (Di1) for the distributed remote PLC device 3 as data for a response frame, outputs the selection signal to the transmission data multiplexer (MPX) 512 through the data transfer control bus 535. Then the machine input data (Di1) inputted from the external machine input I/F section 531 is latched in the transmission data storing section 511 (step S718).

Herein, as for transmission data, in addition to the machine input data (Di1), also the data latched in the external machine output I/F section 530 can be selected as current machine output information by the transmission data multiplexer (MPX) 512 through the external machine output data bus 519.

On the other hand, the header information generating section 509 generates a header pattern of a machine input transfer frame from each of the inputted status signals such as a PLC operation status 538 inputted from the PLC control section 9 or station number information 539 specified by the station number select switch 532 or the like (step S718).

Then, when a period of time previously set by the transfer timing generating section 520 has passed and the remote PLC side transmission start signal 540 is generated, the remote PLC data transmitting section 510 forms each of the data for the transmission data storing section 511 as well as for the header information generating section 509 to a response frame (a machine input transfer frame shown in FIG. 13B) to output the frame to the remote PLC communication line 110 (step S719).

In this embodiment, the machine input transfer frame as a response frame is formed as shown in FIG. 13B. Namely, remote PLC machine input data (Di1) is retained in "Di#0 to Di#3" as 4-byte data. Also, the header information generating section 509 analyzes each of status signals inputted to header information "SADR" for generation of header information.

For instance, "a received information pattern" for the header information is obtained by referring to an error detection signal, obtained by being analyzed by the header information analyzing section/received alarm detecting section 503 and through the error detection signal bus 533, indicating whether any error is present or not in the signal when it is received, "a status of the PLC section" is obtained by referring to the PLC operation status 538 inputted from the PLC control section 9, and furthermore "information for the original station number" is obtained by referring to the station number information 539 specified with the station number select switch 532.

Then, the main body 1a of the NC device receives this response frame, latches the data in the received data storing section 606, and the header information is analyzed by the header analyzing/received status storing section 608. Then if the response frame is normal, a normal reception flag is set in the received status.

The processing described above is an operation for transferring one frame, and is successively executed in synchronism with an NC side transmission start signal 610 generated once for about 111 μs. Herein, in the machine output transfer frame shown in FIG. 13A, "Do#0 to Do#3" as the 4-byte remote PLC machine output data (Do1) are controlled so that each 4-byte is transferred successively to each of the distributed remote PLC devices 3 each time when one frame is transferred among the data containing therein those for eight stations in the transmission data storing section 601.

For instance, #0 station transmission data (4 bytes) shown in FIG. 11A is transmitted in first frame transfer, #1 station transmission data (4 bytes) is transmitted in second frame transfer delayed by about 111 μs from the first transfer, and further #2 station transmission data (4 bytes) is transmitted in third frame transfer delayed by about 111 μs from the second transfer, and as described above the transmission is continued until #7 station transmission data (4 bytes) is transferred in eighth frame transfer, and after the last transmission, the CPU 101 updates contents of the data for the transmission data storing section 601, and in ninth frame transfer, #0 station transmission data (4 bytes) which is newly updated is transmitted.

As described above, when frame transfer of data for eight stations (this is described as one block transfer) is completed, the CPU 101 repeats the processing described above to execute next data transfer. FIG. 12 shows a relation between a transmission frame (a machine output transfer frame) transferred from the main body 1a of the NC device to either the distributed remote PLC device 3 or the remote IO unit 2 and a transmission frame (a machine input transfer frame) transferred from either the distributed remote PLC device 3 or the remote IO unit 2 to the main body 1a of the NC device and also shows a relation between one frame transfer cycle and one block transfer cycle.

FIG. 14 shows an example of connection of both of the distributed remote PLC device 3 and the remote IO unit 2 which are shared by making a data transfer cycle as well as configuration of a data frame, each between the main body 1a of the NC device and the distributed remote PLC device 3, identical to a data transfer cycle as well as configuration of a data frame each between the main body 1a of the NC device and the remote IO unit 2, and by connecting the distributed remote PLC device 3 as well as the remote IO unit 2 each to the identical remote PLC communication line 110.

As described above in detail, with this embodiment, the distributed remote PLC device 3 and the remote IO unit 2 can be connected to the identical remote PLC communication line 110, so that both of the devices can be shared, which makes it possible to make use of software assets having been used and also to obtain an NC control system with high flexibility.

The distributed remote PLC device 3 has the configuration in which the device can select not only machine output data processed by the device but also machine output data inputted thereinto through the remote PLC communication line 110, so that the distributed remote PLC device 3 can process data from the main body 1a of the NC device as well as machine data processed according to a sequence program for a distributed remote PLC device 3 other than the device, which makes it possible to obtain a highly flexible NC control apparatus.

Furthermore, in PLC operation in the distributed remote PLC device 3, data inputted through the remote PLC communication line 110 can also be handled in addition to machine data inputted/outputted inside each of the distributed remote PLC devices 3, so that it is possible to equivalently execute logical operation for data for all machines handled by the NC control system, and a speed of PLC processing in the whole NC control system can be improved by executing parallel PLC processing.

Figure 15A:
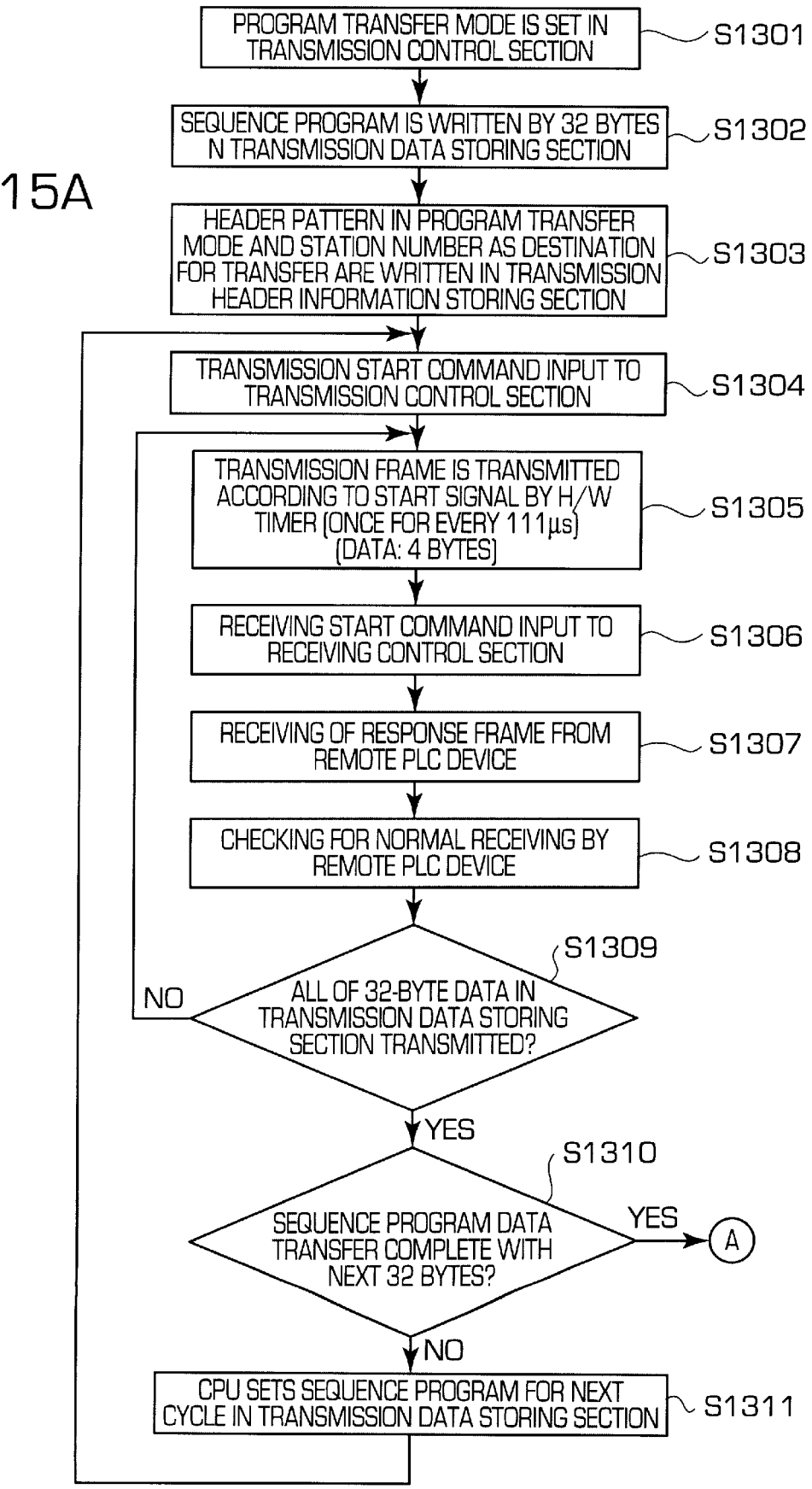
FIG. 15 is a flow chart showing a operational sequence in the data transfer processing in the side of a main body of an NC device in the program transfer mode between the main body of the NC device and a remote PLC device according to Embodiment 3 of the present invention.
Figure 15B:
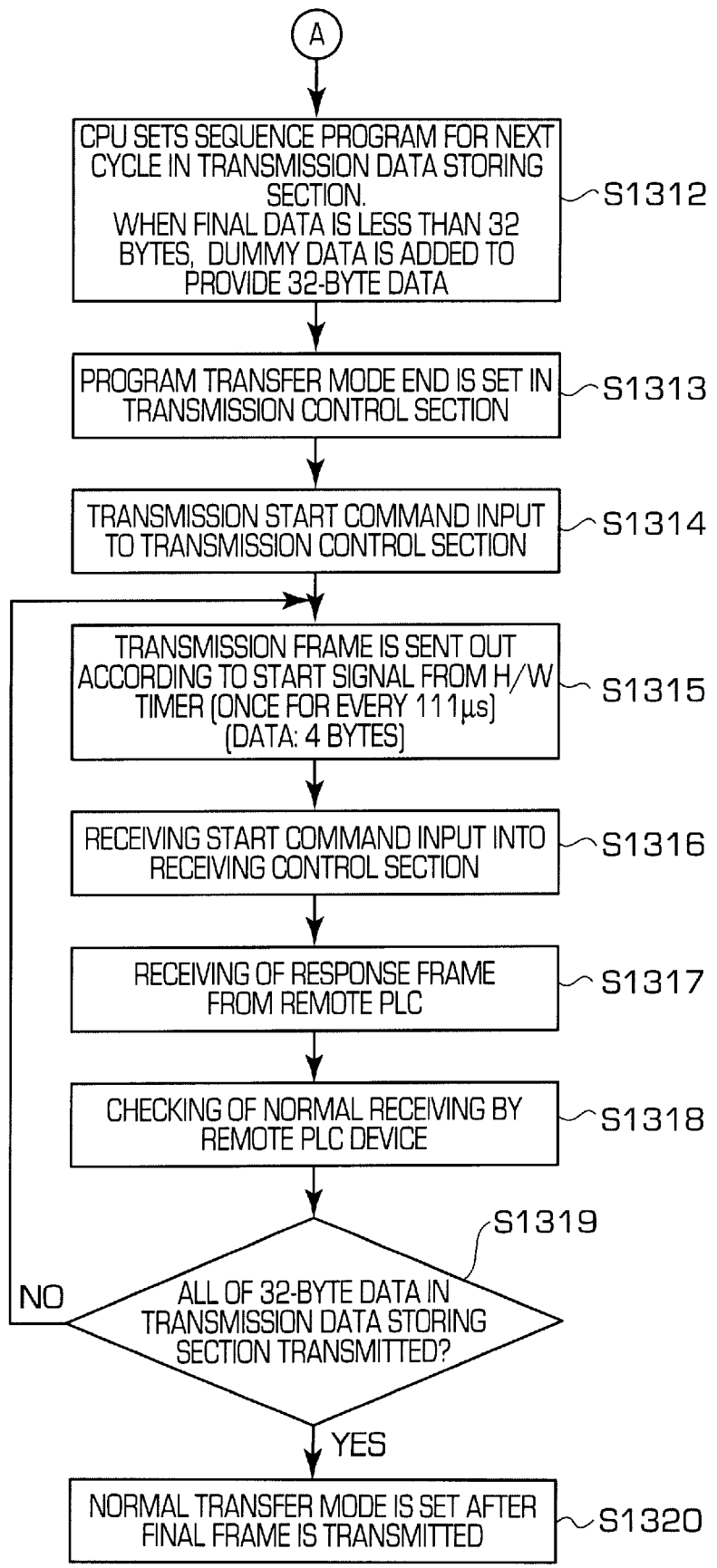
Figure 16:
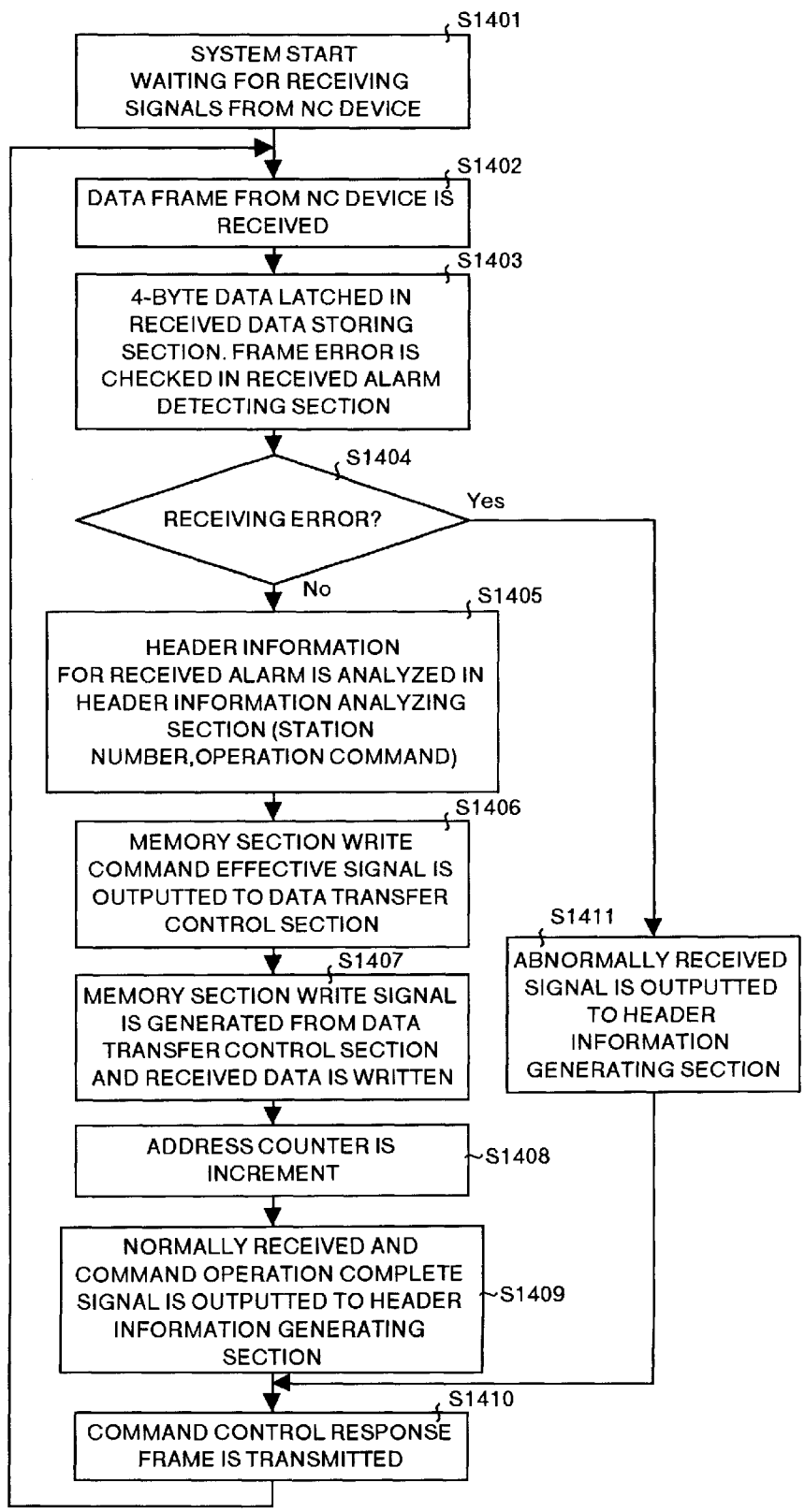
FIG. 16 is a flow chart showing an operational sequence in the data transfer processing in the side of a remote PLC device in the program transfer mode between the main body of an NC device and the remote PLC device according to Embodiment 3 of the present invention.
Figure 17:
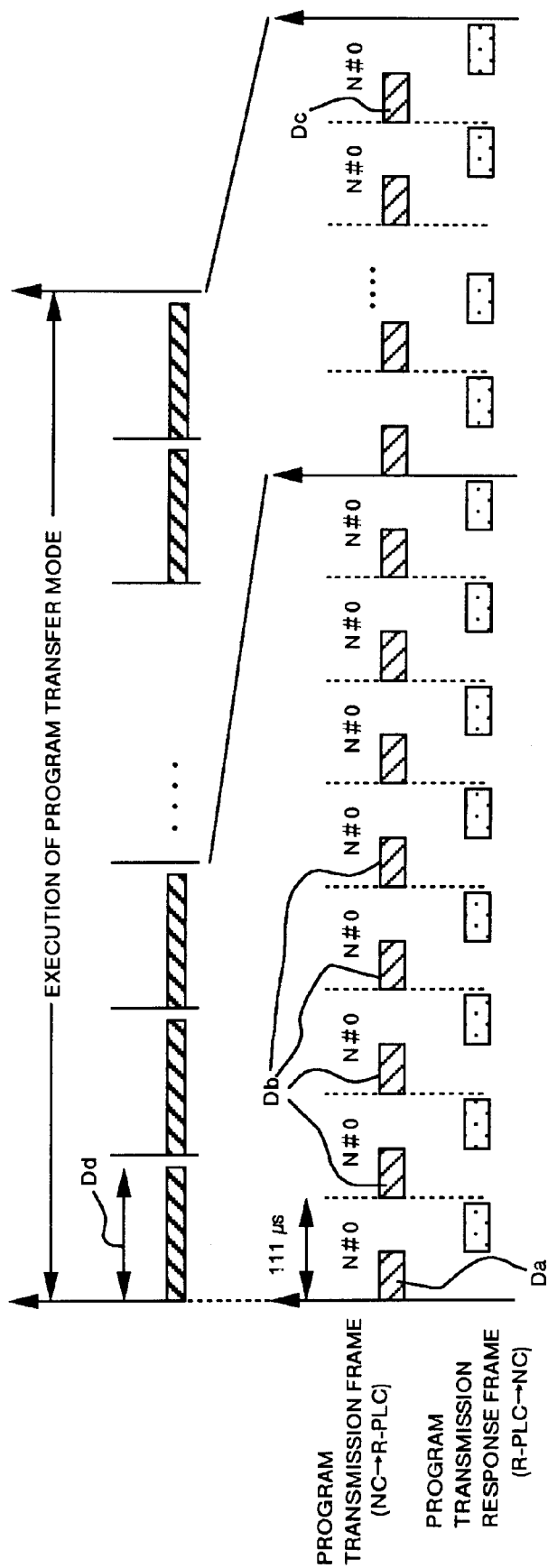
FIG. 17 is an explanatory view showing a timing for data transfer in the program transfer mode between the main body of an NC device and a remote PLC device according to Embodiment 3 of the present invention.
Figure 18A:
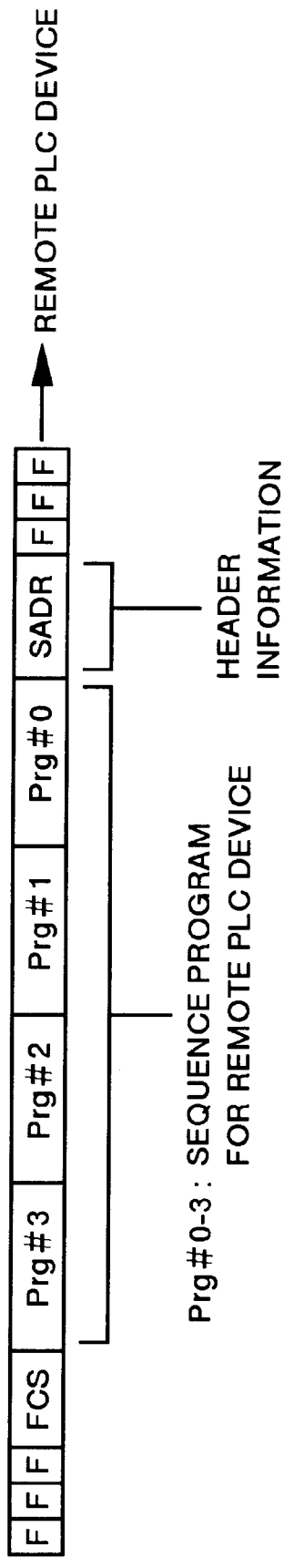
FIGS. 18A and 18B are explanatory views showing a format of a data frame in the program transfer mode between the main body of an NC device and a remote PLC device according to Embodiment 3 of the present invention.
Figure 18B:
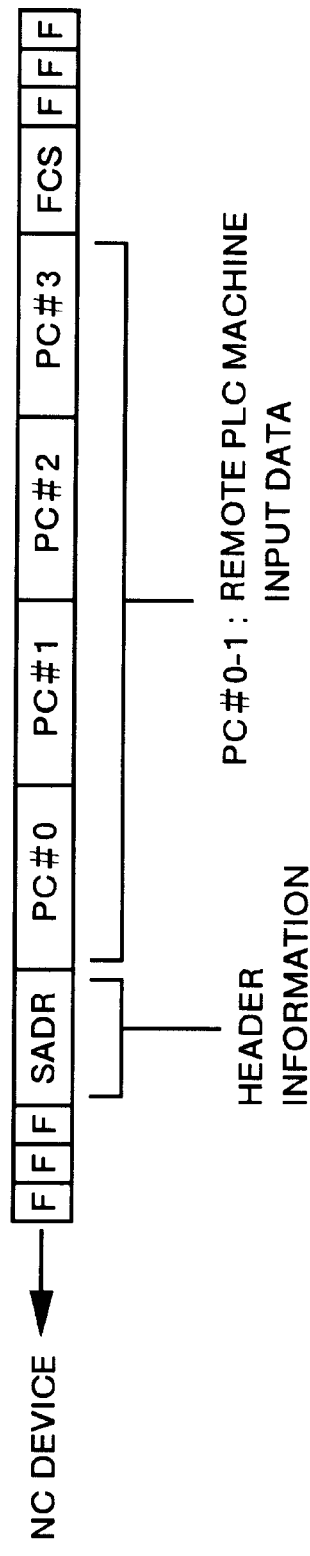

Description is made for an operation for downloading a sequence program according to Embodiment 3 of the present invention with reference to FIG. 8, FIGS. 11A to 11C, and FIG. 14 to FIGS. 18A and 18B. FIG. 15 is a flow chart showing an operational sequence in data transfer processing in the side of the main body 1a of the NC device in the program transfer mode between the main body 1a of the NC device and the distributed remote PLC device 3, FIG. 16 is a flow chart showing an operational sequence in data transfer processing in the side of the distributed remote PLC device 3 in the program transfer mode between the main body 1a of the NC device and the distributed remote PLC device 3, FIG. 17 is an explanatory view showing a data transfer timing in the program transfer mode between the main body 1a of the NC device and the distributed remote PLC device 3, and FIGS. 18A and 18B are explanatory views showing format of a data frame in the program transfer mode between the main body 1a of the NC device and the distributed remote PLC device 3.

In the figures, the same reference numerals are assigned to the same sections as or the sections corresponding to those in the example based on the conventional technology as well as in Embodiments 1 and 2. Description is made hereinafter for operations for downloading a sequence program according to the flow chart shown in FIG. 15. In a case where data requiring a large amount of memory space such as a sequence program or the like is to be downloaded, it is desirable for configuration of the system to continuously transmit data to a particular device.

Herein, description is made for the processing for transmitting all data frames that can be transmitted in one block transfer to a specified device as shown in FIG. 17. It should be noted that description is made herein for a case where the transmission is executed to a device #B (the station number is a fifth station) of the distributed remote PLC devices 3 shown in FIG. 14.

In a case where it is required to download a sequence program for PLC processing due to such reasons as that the system is changed or that connection for a machine input/output signal connected to the distributed remote PLC device 3 is changed, at first the CPU 101 sets the transmission control section 603 in the program transfer mode (step S1301). Then data to be downloaded is written by 32 bytes in the transmission data storing section 601 (step S1302) . A state of the transmission data storing section 601 at this point of time indicates the case of the program transfer mode shown in FIG. 11C.

Then the data containing therein the program transfer mode and the specified station number is written in the transmission header information storing section 602 (step S1303). Herein it is assumed that the specified station number is to "4405". Then, when a command for transmission start is written in the transmission control section 603 (step S1304), the data transmitting section 605 adds first 4-byte data (four sections from the top in FIG. 11C) in the transmission data storing section 601, a header pattern (for instance, a pattern "4415" indicating execution of download data transfer to the fifth station) in the transmission header information storing section 602, and CRC check data "FSC" computed from these data described above to the command and generates a program transmission frame shown in FIG. 18A, and transmits data to the remote PLC communication line 110 due to generation of an NC side transmission start signal in the H/W timer 117 (step S1305).

After this data is transmitted, the CPU 101 writes a receiving start command in the receiving control section 607 and is waiting for receiving data from the specified device (step S1306). Then, by receiving a response frame from the specified distributed remote PLC device 3 (step S1307), the CPU 101 recognizes that the distributed remote PLC device 3 successfully receives the data (step S1308), checks whether all the data for the transmission data storing section 601 is transmitted (one block transfer is completed) or not (step S1309), and repeats processing between steps S1305 to S1309 if any data is remaining.

When transfer for one block is completed, the CPU 101 tries to set the next 32-byte data block, but before the operation for setting the 32-byte data, the CPU 101 checks whether the data transfer in this block has been completed or not (step S1310). And in a case where the data transfer is still continued, the next data block is written in the transmission data storing section 601 (step S1311), and system control returns to step S1304. Also in a case where the data transfer of the program is finished in the next transfer cycle, the final data block is written in the transmission data storing section 601 (sep S1312), and a command for end of the program transfer mode is set in the transmission control section 603 (step S1313).

At this point of time, in a case where the final data block does not reach 32 bytes, the CPU 101 adds dummy data to the block to make a 32-byte data block, and sets the data in the transmission data storing section 601. Then, the CPU 101 executes operations in steps S1314 to S1319, and returns the mode of the transmission control section 603 to the normal mode when the final block transfer is completed, and terminates the program transfer mode (step S1320).

Also, as for header patterns of data frames to be transmitted in the program transfer mode, as shown in FIG. 17, a header pattern (Da) of a first frame is "4405" indicating start of download, a header pattern (Db) of a second frame and thereafter is "4415" indicating transfer for downloading, and a header pattern (Dc) of a last frame in a last block is "4425" indicating completion of download. All the 32-byte data (Dd) to be transferred in a cycle is transferred to each of the specified distributed remote PLC devices 3.

Herein, as another example of a header pattern, when download is started, "SADR" may be set to "440n", and in a case where the download is completed, "SADR" may be set to "442n".

Next description is made for processing in the distributed remote PLC device 3 with reference to FIG. 16. The data section of a frame received by the data receiving section 501 is latched in the received data storing section 502, and the header information thereof is inputted into the header information analyzing section/received alarm detecting section 503 (steps S1401, S1402).

Then, the header information analyzing section/received alarm detecting section 503 checks any error according to the CRC, and outputs an error detection signal to the header information generating section 509 through the error detection signal bus 533 if any reception error is detected (steps S1403, S1404, S1411).

If any error on reception of a signal is not detected, the header information analyzing section/received alarm detecting section 503 analyzes the header information (step S1405), and outputs an operational information signal 534 to the data transfer control section 504 (step S1406). The data transfer control section 504 receives this signal to output a write signal to the memory section 8 through the data transfer control bus 535, and writes data for the received data storing section 502 therein (step S1407). Then the data transfer control section 504 increases an address counter 505 for preparation of the next write operation of data (step S1408).

Then the data transfer control section 504 outputs a signal indicating of successful reception of the data and completion of the operation to the header information generating section 509, and also outputs a signal for selecting machine input data for the distributed remote PLC device 3 as data for a response frame to the transfer data multiplexer (MPX) 512 through the data transfer control bus 535, and latches the machine input data in the transmission data storing section 511.

On the other hand, to generate header information for the machine input information frame shown in FIG. 13B, the header information generating section 509 analyzes each status signal inputted in the header information "SADR" (step S1409). For instance, "a received information pattern" for the header information is obtained by referring to an error detection signal, obtained by being analyzed by the header information analyzing section/received alarm detecting section 503 and through the error detection signal bus 533, indicating whether any error is present or not in the signal when it is received, "a status of the PLC section" is obtained by referring to the PLC operation status 538 inputted from the PLC control section 9, and furthermore "information for the original station number" is obtained by referring to the station number information 539 specified with the station number select switch 532.

Then, when a period of time previously set by the transfer timing generating section 520 has passed and the remote PLC side transmission start signal 540 is generated, the remote PLC data transmitting section 510 forms each of the data for the transmission data storing section 511 as well as for the header information generating section 509 to a response frame (a machine input transfer frame shown in FIG. 13B) and outputs the frame to the remote PLC communication line 110 (step S1410).

Herein the transmission response frame has the same configuration as that of a program transmission response frame shown in FIG. 18B, and data for the header information "SADR" is as follows. Namely "SADR" is "521n" on successful reception of the data, and "SADR" is "451n" on erroneous reception of the data, wherein the reference code n indicates any of the device station numbers 0 to 7.

For this reason, in a case where the station number of the distributed remote PLC devices 3 is #5 and the frame transferred from the main body 1a of the NC device is successfully received, "5215" is generated for data for the header information, and then machine input data (PC #0 to PC #3) for the distributed remote PLC device 3 is added thereto by 4 bytes, and furthermore CRC check data "FCS" computed with these data is added thereto.

As described above in detail, with the embodiment, a specific sequence program is downloaded to each of the plurality of distributed remote PLC devices 3 from one unit of main body 1a of the NC device through the remote PLC communication line 110, so that it is possible to change the sequence program for each of the distributed remote PLC devices 3 with one operation from the main body 1a of the NC device, and sequence programs for the plurality of distributed remote PLC devices 3 can uniformly be managed by the main body 1a of the NC device, which makes it possible to improve operability and adaptability for maintenance of the NC control system, which is extremely advantageous.

Figure 19:
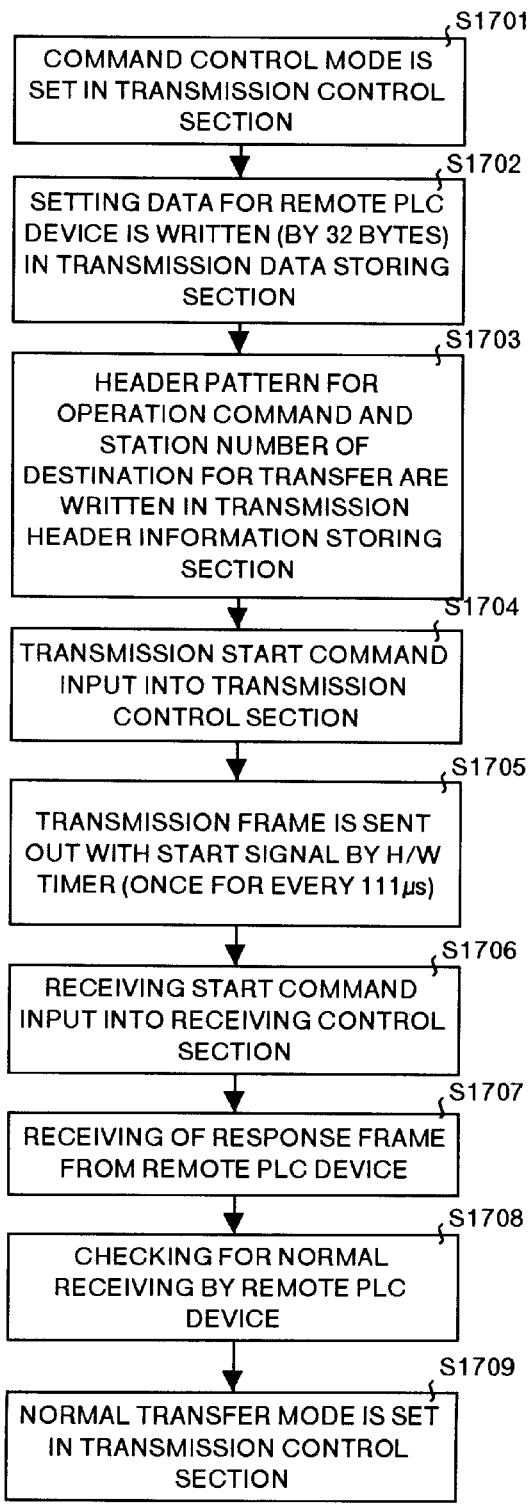
FIG. 19 is a flow chart showing an operational sequence in the data transfer processing in the side of a main body of an NC device in a command control mode between the main body of the NC device and the remote PLC device according to Embodiment 4 of the present invention.
Figure 20:
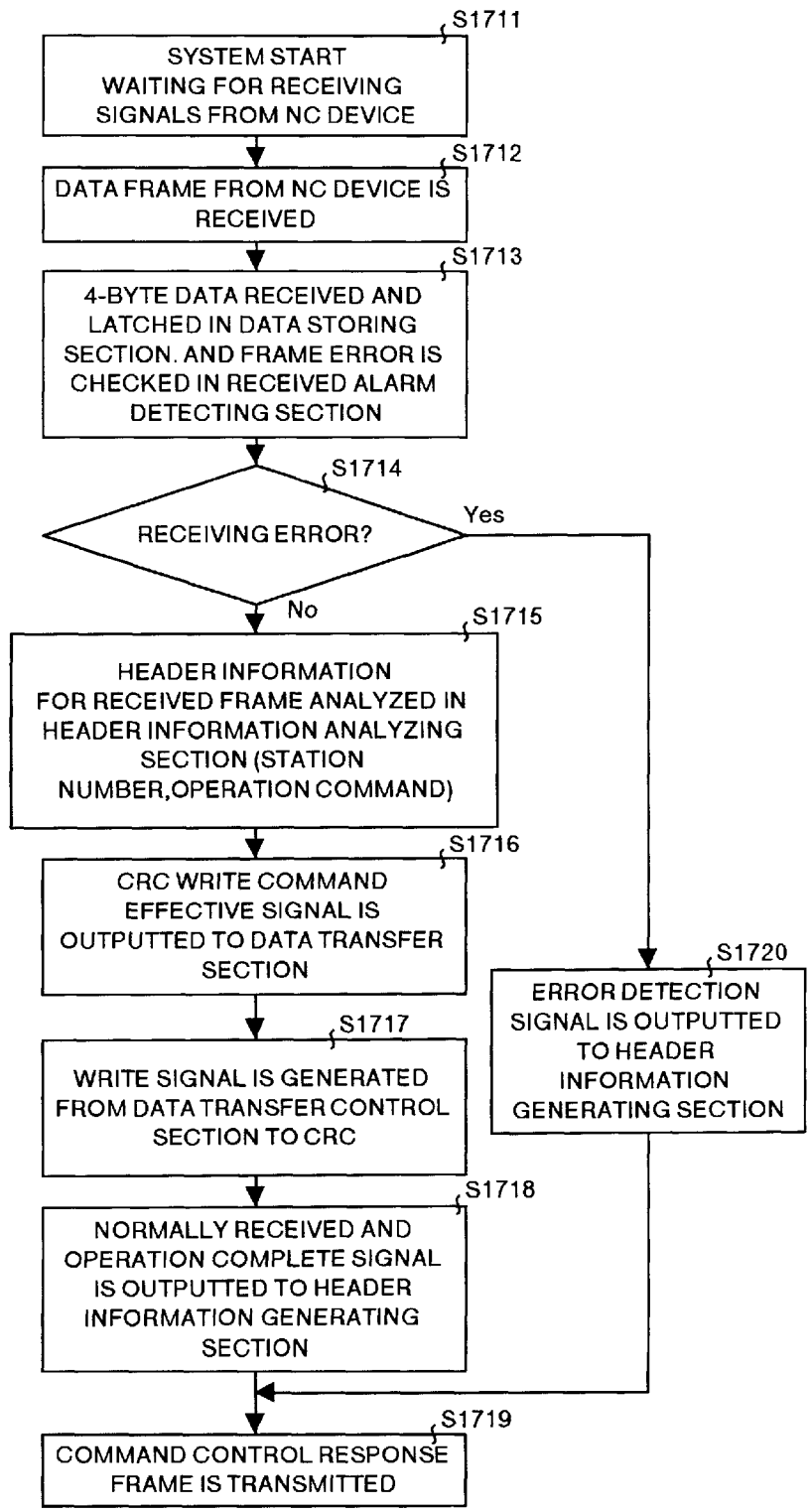
FIG. 20 is a flow chart showing an operational sequence in the data transfer processing in the side of a remote PLC device in the command control mode between the main body of an NC device and the remote PLC device according to Embodiment 4 of the present invention.
Figure 22A:
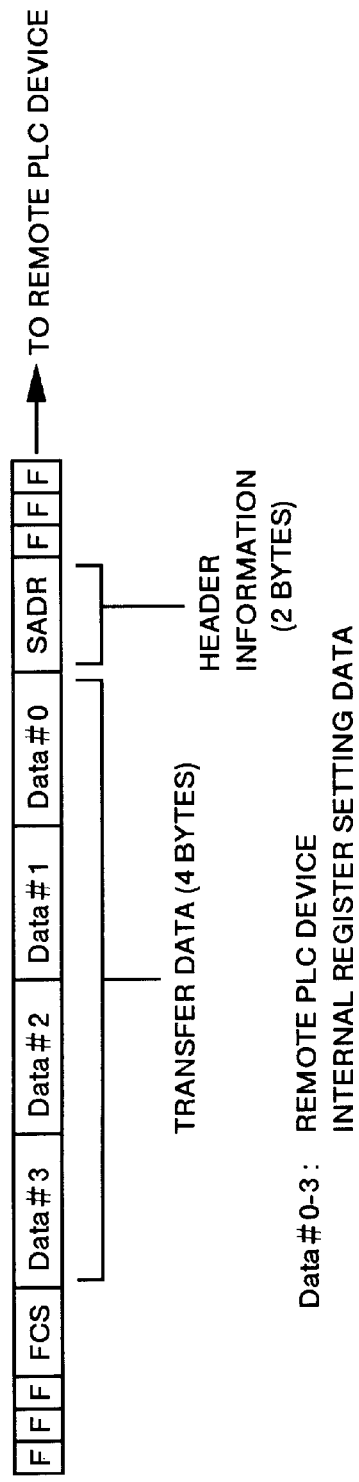
FIGS. 22A and 22B are explanatory views showing a format of a data frame in the command control mode between a main body of an NC device and a remote PLC device according to Embodiment 4 of the present invention.
Figure 22B:
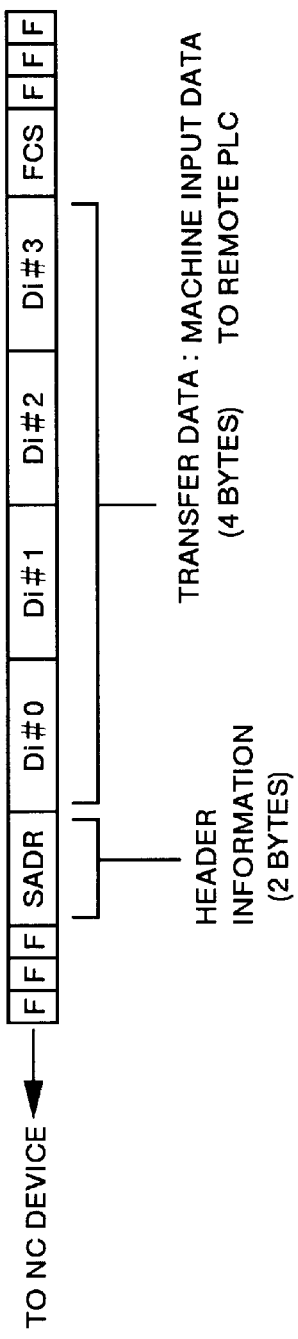

Description is made for data transfer processing in the command control mode according to Embodiment 4 of the present invention with reference to FIG. 8, FIGS. 11A to 11C, FIG. 14, and FIG. 19 to FIGS. 22A and 22B. FIG. 19 is a flow chart showing an operational sequence in the data transfer processing in the side of the main body 1a of the NC device in a command control mode between the main body 1a of the NC device and the distributed remote PLC device 3, FIG. 20 is a flow chart showing an operational sequence in the data transfer processing in the side of the distributed remote PLC device 3 in the command control mode between the main body 1a of the NC device and the distributed remote PLC device 3, FIG. 21 is an explanatory view showing a data transfer timing in the command control mode between the main body 1a of the NC device and the distributed remote PLC device 3, and FIGS. 22A and 22B are explanatory views showing format of a data frame in the command control mode therebetween.

In the figures, the same reference numerals are assigned to the same sections as or the sections corresponding to those in the example based on the conventional technology as well as in Embodiments 1 to 3. Data transfer in the command control mode in this embodiment is a transfer mode executed for controlling setting of each of the registers incorporated in each of the distributed remote PLC devices 3, start or stop of sequence programs each downloaded. Herein, description is made for a case where data is set in the data temporary storage register (described as CCR hereinafter) 517 in the device #B (the station number is set to the fifth station) of the distributed remote PLC devices shown in FIG. 14.

Description is made hereinafter for operations for data transfer in the side of main body 1a of the NC device in the command transfer mode according to the flow chart shown in FIG. 19. The CPU 101, at first, sets the transmission control section 603 in the command control mode (step S1701).

Then, the CPU 101 writes data to be set in the header section with 4 bytes in the transmission data storing section 601 having a 32-byte buffer (step S1702). Herein, the transfer data "Data #0 to Data #3" for a command control request frame shown in FIG. 22A indicates 4-byte data. The CPU 101 also writes header information "SADR" containing therein a command for data set to CCR 517 and a specified station number as "4305" in the transmission header information storing section 602 (step S1703). The transmission data storing section 601 at this point of time shows a state, as shown in "a case of a command control mode" shown in FIG. 11B, in which transmission data to a station #N is present only by 4 bytes therein.

Herein, as for examples of a pattern of header information, "SADR" is "431n" in a case where data for an address counter is set, "SADR" is "432n" in a case where a machine output control register is set, "SADR" is "530n" in a case where a PLC is started, and "SADR" is "531n" in a case where the PLC is stopped, or the like, wherein the reference code n indicates any of the device station numbers 0 to 7.

Then, when the CPU 101 writes a command for starting transmission in the transmission control section 603 (step S1704), the data transmitting section 605 generates header information ("4305" as a 2-byte header pattern) for the transmission header information storing section 602, 4-byte data for the header in the transmission data storing section 601 ("Data #0 to Data #3" shown in FIG. 22A), and a 1-byte CRC check data ("FCS") for these data as a command control request frame shown in FIG. 22A, and when an NC side transmission start signal 610 for the H/W timer 117 is generated, the data transmitting section transmits data to the remote PLC communication line 110 (step S1705).

After the transmission of the data, the CPU 101 writes a receiving start command in the receiving control section 607 and waits for receiving data from each of the distributed remote PLC devices 3 (step S1706). Then, by receiving a response frame from the distributed remote PLC device 3 (step S1707), the CPU 101 recognizes that the distributed remote PLC device 3 successfully receives the data (step S1708), returns the mode in the transmission control section 603 to a normal mode to end the command control transfer mode (step S1709). As shown in FIG. 21 "Da", only one frame transfer is executed in a transfer cycle in this mode.

On the other hand, processing in the distributed remote PLC device 3 is as shown in the flow chart shown in FIG. 20, and the data section of a frame received by the data receiving section 501 is latched in the received data storing section 502, and the header information thereof is inputted in the header information analyzing section/received alarm detecting section 503 (steps S1711, S1712). Then, the header information analyzing section/received alarm detecting section 503 checks any error according to the CRC, and outputs an error detection signal to the header information generating section 509 through the error detection signal bus 533 if any receiving error is detected (steps S1713, S1714, S1720).

However, if any error in receiving a signal is not detected, the header information analyzing section/received alarm detecting section 503 analyzes the header information (step S1715), and outputs an operational information signal 534 to the data transfer control section 504 (step S1716). The data transfer control section 504 receives this signal and outputs a write signal to the CCR 517 through the data transfer control bus 535, and writes the data for the received data storing section 502 therein (step S1717).

Then the data transfer control section 504 outputs a signal indicating that the data was normally received and the receiving operation is complete to the header information generating section 509, and also outputs a signal for selecting machine input data for the distributed remote PLC device 3 as data for a response frame to the transmission data multiplexer (MPX) 512 through the data transfer control bus 535 to latch the machine input data in the transmission data storing section 511. On the other hand, the header information generating section 509 generates a header pattern of the response frame from each of the inputted signals (step S1718).

Then, when a period of time previously set by the transfer timing generating section 520 has passed and the remote PLC side transmission start signal 540 is generated, the remote PLC data transmitting section 510 forms each of the data for the transmission data storing section 511 as well as for the header information generating section 509 into a response frame (a command control response frame shown in FIG. 22B) and outputs the frame to the remote PLC communication line 110 (step S1719).

Herein the response frame has the same configuration as that of a command control response frame shown in FIG. 22B, and data for the header information "SADR" is as follows. "SADR" is "522n" when the data is received successfully, and "SADR" is "452n" when the data is received erroneously, wherein the reference code n indicates any of the device station numbers 0 to 7.

Then, as for the contents of the command control response frame in a case where the fifth station of the distributed remote PLC devices 3 successfully receives the data, a frame with 2 bytes for "5225" as the header information and 4 bytes for "Di#0 to Di#3 as transfer data and 1 byte as checking these data each added thereto is generated.

As described above in detail, with the embodiment, the main body 1a of the NC device controls setting of each register incorporated in each of the distributed remote PLC devices 3 and start or stop of the downloaded sequence program in the command control mode, so that the NC device receives machine input data from any of the distributed remote PLC devices 3 after recognizing a normal operation of the distributed remote PLC device 3 as well as checking any error in the data, which makes it possible to obtain an NC control system with high reliability.

Figure 23:
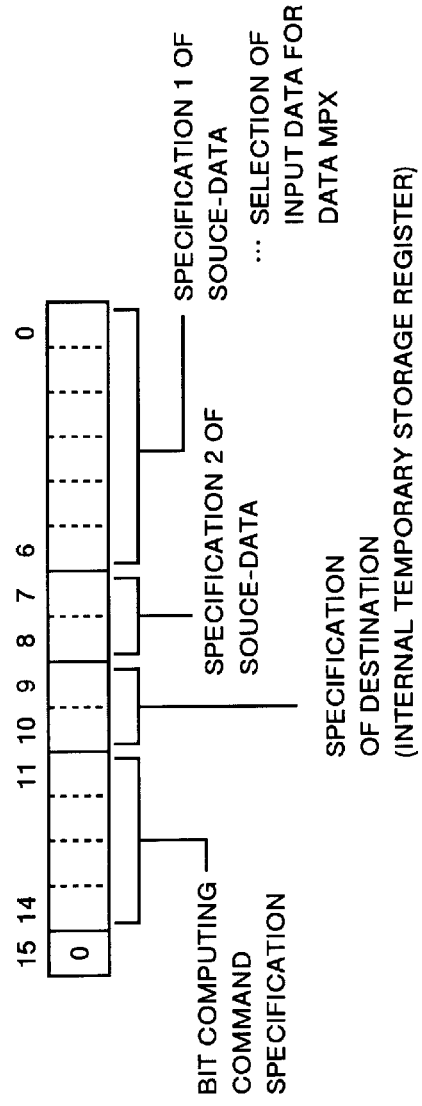
FIG. 23 is an explanatory view showing a format of a bit computing command for a remote PLC device according to Embodiment 5 of the present invention.
Figure 24:
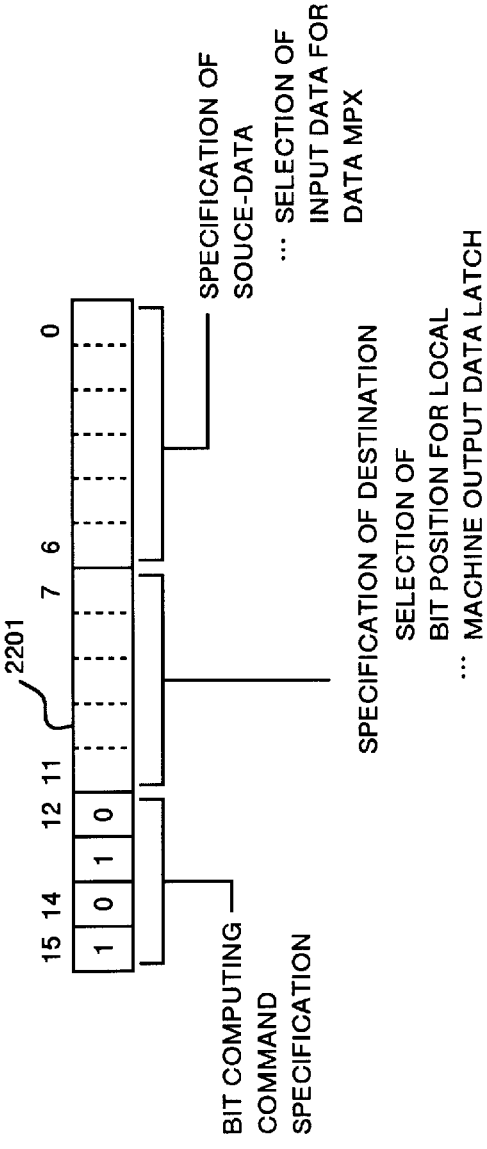
FIG. 24 is an explanatory view showing a machine output command format from a remote PLC device according to Embodiment 5 of the present invention.

Description is made for PLC operation in the distributed remote PLC device 3 according to Embodiment 5 of the present invention with reference to FIG. 7, FIG. 23, and FIG. 24. FIG. 23 is an explanatory view showing format of a bit computing command for the distributed remote PLC device 3, and FIG. 24 is an explanatory view showing format of a machine output command for the distributed remote PLC device 3.

In the figures, the same reference numerals are assigned to the same sections as or the sections corresponding to those in the example based on the conventional technology as well as in Embodiments 1 to 4. The command formats of a sequence program shown in FIG. 23 and FIG. 24 are stored in the EEPROM 507 constituting the memory section 8 of the distributed remote PLC device 3.

Input data for an object of the PLC computing unit consists of main machine output data latched in the main machine output latch 506 through the remote PLC communication line 110, data receiving section 501, and received data storing section 502 from the main body 1a of the NC device, and obtained through the main machine output data bus 521; local machine output data, which is feedback data for the machine output processed by the PLC computing unit 516, obtained through the local machine output data bus 522; machine data 15 inputted from an external device through the external machine input I/F section 531 of the distributed remote PLC device 3; and temporary data latched in the data temporary storage register 517 and obtained through the internally-temporarily maintained data bus.

Then each of these data is inputted into the data multiplexer (data MPX) 11. Among the data, which data is to be handled or which bit of the data should be handled as data for computation is decided according to code for computing command read out from the EEPROM 507. Namely, the PLC command analyzing section 508 analyzes the code for computing command, and specifies the lowest 7 bits in the command code, whereby one bit as an object for computing among the data inputted in the data multiplexer (data MPX) 11 is selected to be inputted to the PLC computing unit 516 as source data 524 for bit computing.

For instance, in the format of the command code shown in FIG. 23, in a case where the command code is "0010000000011111", the data in the 31st bit of the machine input bus is selected among the data inputted in the data multiplexer (data MPX) 11.

In FIG. 23, bits 0 to 6 specify data corresponding to a bit in the machine input but, and for instance, "0000000" specifies Data 0 in the machine input bus, "0011111" specifies Data 31 in the machine input bus, "0100000" specifies Data 0 in the local machine output bus, "0111111" specifies Data 31 in the local machine output bus, "1000000" specifies Data 0 in the main machine output bus, "1011111" specifies Data 31 in the main machine output bus, and "1100000" specifies Data 0 in the temporary storage register.

In FIG. 23, bits 11 to 14 are used for specification of a command for bit computing, and for instance, "0000" is used for an LD command, and "0001" is used for an OUT command or the like.

The PLC computing unit 516 actually executes a computing command analyzed by the PLC command analyzing section 508, while the internal sequencer 537 for PLC control in the PLC control section 9 controls the command. In a case where the command is a command for execution of bit computing, data selected by the data multiplexer (data MPX) 11 is inputted into the PLC computing unit 516, and the PLC computing unit 516 executes the logical operation instructed from the internal sequencer 537 for PLC control through the PLC control bus 536, and temporarily stores the result in the data temporary storage register 517.

At this point of time, data as an object to be computed includes data latched in the data temporary storage register 517 other than the source data 524 for bit computing, and the bit position thereof is decided by the temporarily maintained data multiplexer (MPX) 515. A result of the decision is used again as data for computed result (temporary data obtained through the internally and temporarily maintained data bus 523) in the PLC processing thereafter.

In a case where the command is a machine output command, bit data selected by the data multiplexer (data MPX) 11 is inputted into the machine output data bit position selecting circuit (DX-MPX) 518 as local machine output latch data 525, and the data is latched at a given bit position of the local machine output latch (data LTC) specified by the command code.

For instance, in the format of the command code for a machine output command shown in FIG. 24, in a case where the command code is "1010001010000001", the data in the second bit of the main machine output data obtained through the main machine output data bus 521 is inputted into the bit position selecting circuit (DE-MPX) 518, and this data is outputted to the first bit of the local machine output latch (data LTC).

In FIG. 24, bits 7 to 11 are used for specification of bit positions in the local machine output latch, and for instance, "00000" indicates specification of data output to the 0-th bit in the data latch, "00001"—specification of data output to the first bit in the data latch, and "11111"—specification of data output to the 31st bit in the data latch or the like.

This latched output (local machine output data obtained through the local machine output data bus 522) is fed-back to the input side of the data multiplexer (data MPX) 11 as input data for PLC operation, and is also inputted to the machine output data selector 514 to be outputted to external devices from the external machine output I/F section 530 as machine output data (Do1) by an machine output selecting means described in detail later in a sixth embodiment of the present invention.

As described in detail above, with the embodiment, of main machine output data obtained through the remote PLC communication line 110 from the main body 1a of the NC device, local machine output data which is feedback data for the machine output processed by the PLC computing unit 516, machine data 15 inputted from an external device through the external machine input I/F section 531 of the distributed remote PLC device 3, and temporary data latched in the data temporary storage register 517 and obtained through the internally-temporarily maintained data bus 523, which data is to be treated as input data to be processed by the PLC computing unit 516 or which bit of the data should be handled as data for computing is decided according to the code for computing command read out from the EEPROM 507, so that the PLC computing is executed with all the required data, which makes it possible to obtain an NC control system with high flexibility.

Figure 25:
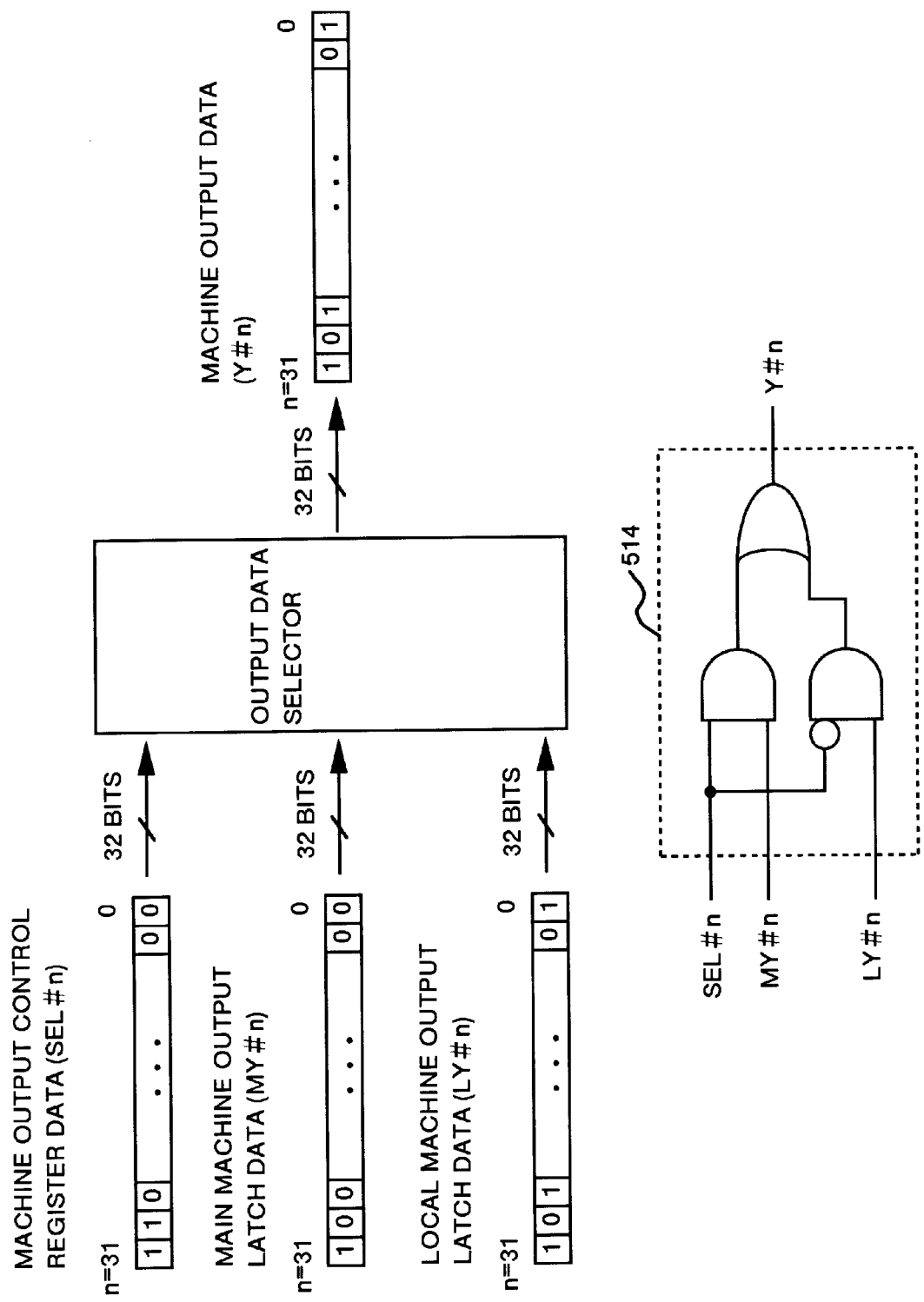
FIG. 25 is a block diagram showing operations of a machine output selecting means in a remote PLC device according to Embodiment of the present invention.
Figure 26:
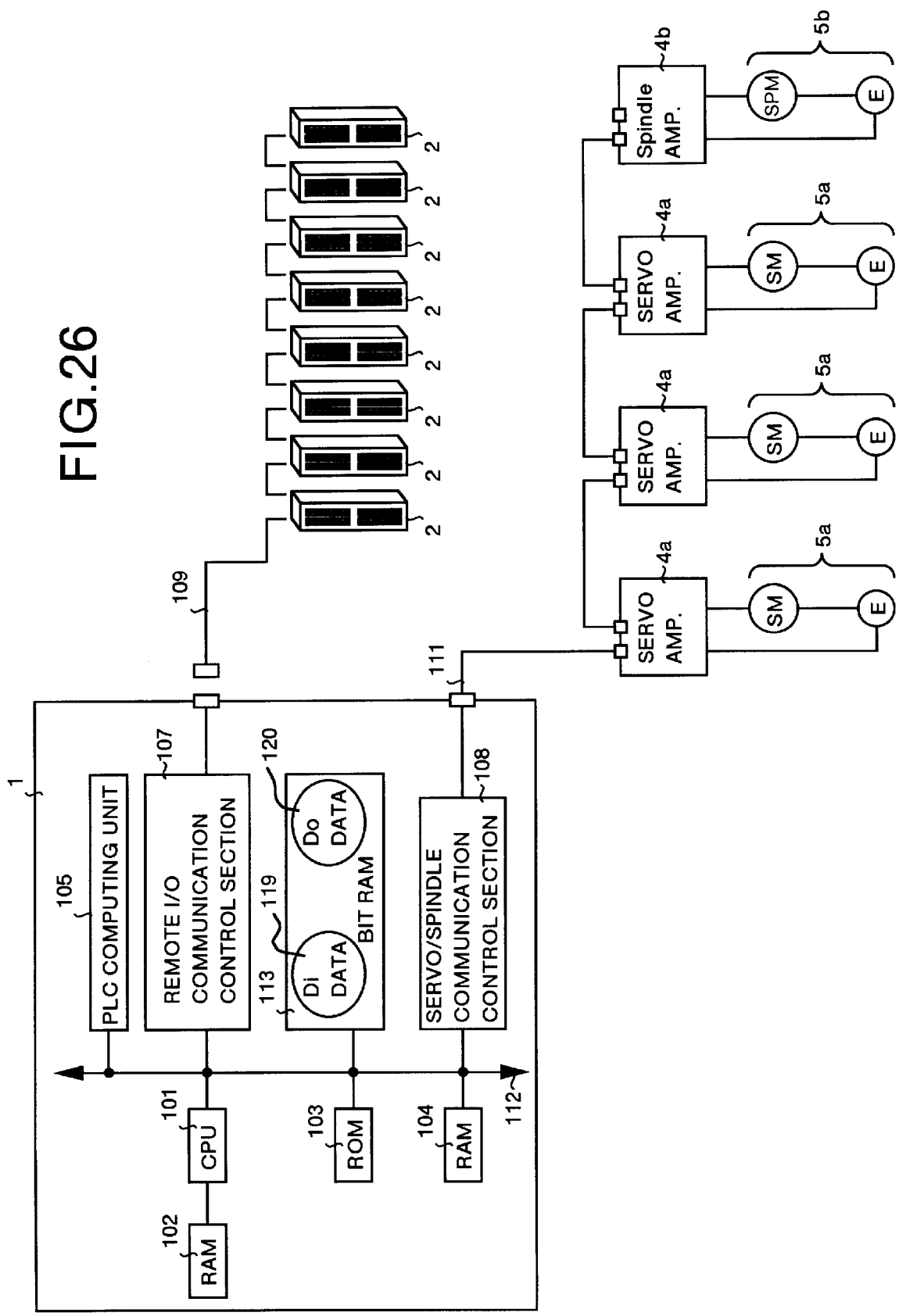
FIG. 26 is a block diagram showing general configuration of a numerical control apparatus using a remote I/O unit based on the conventional technology.
Figure 27:
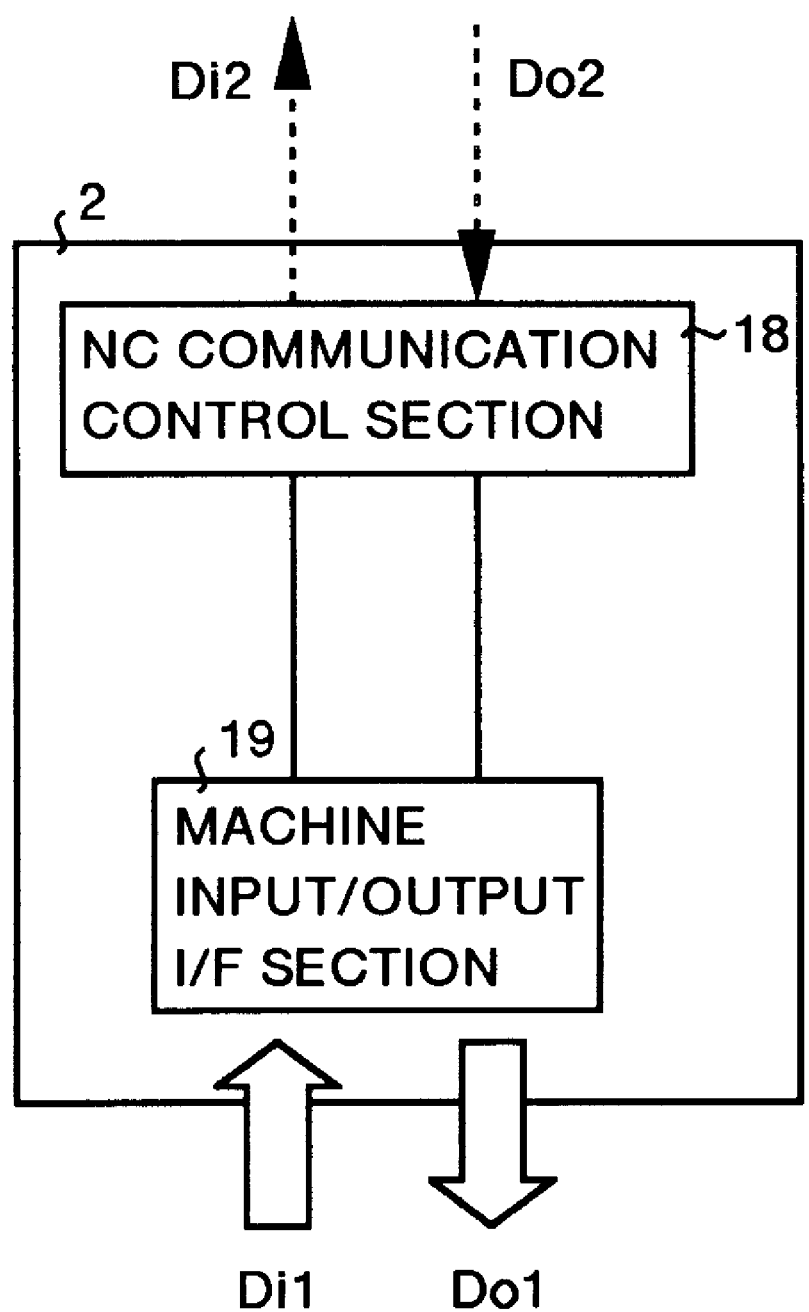
FIG. 27 is a block diagram showing general configuration of a remote I/O unit based on the conventional technology.
Figure 28:
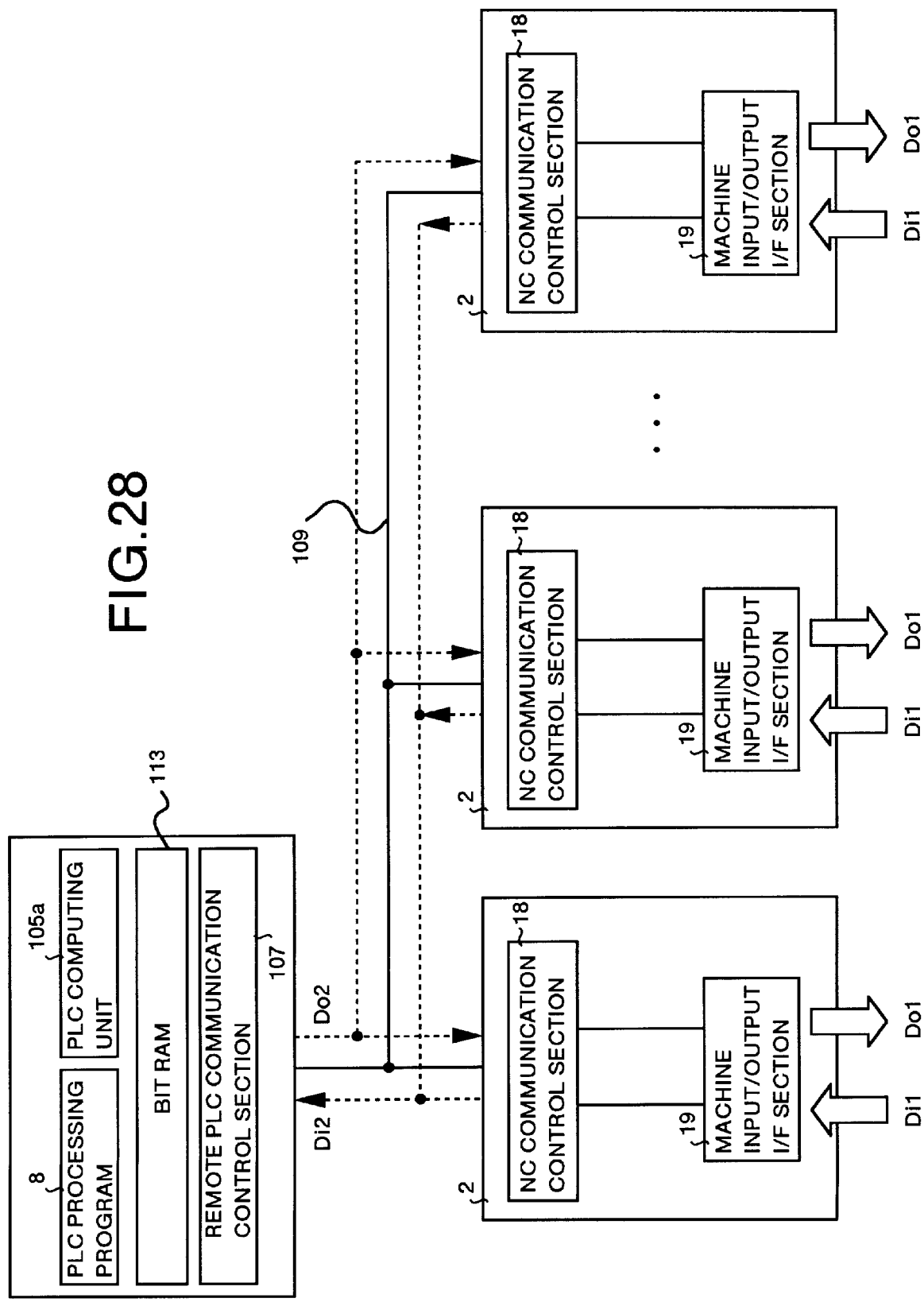
FIG. 28 is a block diagram showing a flow of PLC processing data with a remote I/O unit based on the conventional technology.

Description is made for a machine output selecting means for outputting machine output data from the distributed remote PLC device 3 to external devices according to Embodiment 6 of the present invention with reference to FIG. 25. FIG. 25 is a block diagram showing operations of the machine output selecting means in the distributed remote PLC device 3.

In the figure, the same reference numerals are assigned to the same sections as or the sections corresponding to those in the example based on the conventional technology as well as in Embodiments 1 to 5. Machine output data (Do1, Y#n) outputted to external devices by the distributed remote PLC device 3 has two types of data such as main machine output data (MY#n) received from the main body 1a of the NC device to each point of the machine output with transfer and maintained in the main machine output latch 506, and local machine output data (LY#n) processed according to the sequence program for the distributed remote PLC device 3 and obtained through the local machine output data bus 522.

As a means for selecting either of the data to be outputted, each of the distributed remote PLC devices 3 has a machine output control register (Reg) 513. Herein, data for the machine output control register (Reg) 513 is set to machine output control register data (SEL#n). The system has the configuration in which local machine output data (LY#n) is selected in a case where this machine output control register data (SEL#n) is 1 and the main machine output data (MY#n) is 0.

For this reason, in a case where the machine output control register data (SEL#n) is "110 . . . 00", the main machine output data (MY#n) is "100 . . . 00", and local machine output data (LY#n) is "101 . . . 01" as shown in FIG. 25, machine output data (Y#n) is outputted as "101 . . . 01". It should be noted that this control register can also be set in a command control mode from the remote PLC communication line 110.

As described above, with the embodiment, the distributed remote PLC device 3 has the configuration in which the device can select not only machine output data processed by the device but also machine output data inputted thereinto through the remote PLC communication line 110, so that the distributed remote PLC device 3 can output data from the main body 1a of the NC device as well as machine data processed according to the sequence program for a distributed remote PLC device 3 other than the device, which makes it possible to obtain an NC control apparatus with high flexibility.

Furthermore, the machine output data can be selected in correspondence to each bit, which makes it possible to obtain an NC control apparatus with high flexibility.

The present invention comprises the components as described above, whereby it insures the effects described below.

In a control apparatus having a remote PLC device comprising a main control section and a plurality of remote PLC devices connected via a communication line to this main control section, the main control section comprises a PLC computing unit for managing an entire system comprising this main control section and the plurality of remote PLC devices, and a remote PLC communication control section for executing data transaction through the communication line with the plurality of remote PLC devices; and the remote PLC device comprises a communication control section for executing data transaction via the communication line with the main control section, a memory section for storing therein a sequence program transmitted via the communication line and specified to the system, a machine input/output I/F section for executing data transaction with an external machine controlled by the system, a PLC computing section for executing PLC processing with the sequence program according to at least data transmitted from the main control section and data obtained from the machine input/output I/F section; and for this reason the PLC processing specified to each discrete PLC remote device is executed by the remote PLC device, and the main control section provides controls over operations for starting, stopping, and initializing the remote PLC device, and also manages the PLC processing for the entire system, and as a result processing load for the main control section is reduced, which improves processing efficiency in the entire control apparatus.

The main control section makes each of the remote PLC devices repeatedly execute the PLC processing according to the sequence program specified to the device, and also executes cyclic data transaction with the remote PLC device with a cycle not dependent on operations of a CPU of the main control section, so that independency of each of the remote PLC devices is improved, and a plurality of PLC processing are executed in parallel, which makes it possible to improve a processing speed as well as a response speed in the entire control apparatus.

Data transfer between the main control section and the remote PLC device is executed with a data frame, and this data frame contains at least header information indicating a station number and a transaction state of the remote PLC device and data for the external machine driven by the remote PLC device, so that specific data is allocated to each of the remote PLC device respectively, change of the data can be made by an operation from the main control section, and the main control section can put data for the plurality of remote PLC devices under unified control, which makes it possible to improve operational efficiency and adaptability for maintenance of the entire control apparatus.

A plurality of remote I/O units each having a communication control section for executing data transaction via a communication line and a machine input/output I/F section for executing data transaction with an external machine controlled by the remote PLC device are connected to the communication line to which the main control section and the plurality of remote PLC device are connected; and data transfer between the main control section, the remote PLC devices, and the remote I/O units is executed with data frames each having identical frame length, so that compatibility of software with a remote I/O unit according to the conventional technology is insured, which improves compatibility of the entire control apparatus.

The header information contains data for downloading a specified sequence program to the specified remote PLC device, so that change of the sequence program for the remote PLC device can be made by an operation from the main control section, and the main control section can put sequence programs for the plurality of remote PLC devices under centralized control, which makes it possible to improve operational efficiency and adaptability for maintenance of the entire control apparatus.

The header information contains data for initialization of the remote PLC device and information for starting and stopping when sent from the main control section to the remote PLC device, and also contains information concerning an operating state of the remote PLC device when sent from the remote PLC device to the main control section, so that the main control section controls operational parameters set in each of the remote PLC devices and manages control for starting and stopping each of the remote PLC devices, and as a result a dedicated processor and a control program for controlling inside of each remove PLC device are not required, which makes it possible to realize a low cost and easy-to-manage control apparatus.

The remote PLC device executes the PLC processing by using data subjected to the PLC processing by the remote PLC device as well as data subjected to the PLC processing by other remote PLC device, so that data for all machines controlled by the control apparatus can be computed equivalently, which improves a data processing speed in the entire control apparatus by enabling execution of parallel PLC processing.

The remote PLC device can select any of data subjected to the PLC operation by the remote PLC device, data from the main control section, data inputted from the external machine, and data maintained in the remote PLC device by specifying the number of bits for each command code, so that PLC computing processing is executed by using necessary data, which makes it possible to obtain a control apparatus system with high flexibility.

The remote PLC device is allocated to each function or to each device, so that each of the remote PLC devices is allocated to each function or to each device in the optical state, which improves a processing speed as well as a response speed in the entire control apparatus.

In a method of controlling with a control apparatus having a remote PLC device and comprising a main control section and a plurality of remote PLC devices each connected via a communication line to this main control section, the main control section fetches the number of units of the plurality of remote PLC devices, ID numbers for the remote PLC devices, switch information or the like in an offline transfer mode, downloads a sequence program previously set in the specified remote PLC device, initializes the specified remote PLC device, gives an instruction for start of PLC processing to the specified remote PLC device; and the remote PLC device repeats execution of the PLC processing for data specified according to a sequence program specified to the remote PLC device until it receives a stop command from the main control section, and executes cyclic data transaction between the main control section and the remote PLC device with a cycle not dependent on operations of a CPU of the main control section, so that each of the remote PLC devices executes PLC processing specified to the remote PLC devices respectively, and the main control section controls operations for starting, stopping, and initializing each remote PLC device, and also manages PLC processing in the entire system, and as a result, a processing load of the main control section is reduced, which improves processing efficiency in the entire control apparatus.

Data transfer between the main control section and the remote PLC device is executed with a data frame, and this data frame contains at least header information indicating a station number and a transaction state of the remote PLC device and data for the external machine driven by the remote PLC device, so that specific data is allocated to each of the remote PLC device respectively, change of the data can be made by an operation from the main control section, and the main control section can put control data for a plurality of remote PLC devices under centralized control, which makes it possible to improve operational efficiency and adaptability for maintenance of the entire control apparatus.

The header information contains data for downloading a specified sequence program to the specified remote PLC device, so that change of the sequence program for the remote PLC device can be made by an operation from the main control section, and the main control section can put sequence programs for the plurality of remote PLC devices under centralized control, which makes it possible to improve operational efficiency and adaptability for maintenance of the entire control apparatus.

The header information contains data for initialization of the remote PLC device and information for starting and stopping when sent from the main control section to the remote PLC device, and also contains information concerning an operating state of the remote PLC device when sent from the remote PLC device to the main control section, so that the main control section controls operational parameters set in each of the remote PLC devices and manages control for starting and stopping each of the remote PLC devices, and as a result, a dedicated processor and a control program for controlling each remote PLC device are not required, which makes it possible to realize a low cost and easy-to-manage control apparatus.

This application is based on Japanese patent application No. HEI 8-246589 filed in the Japanese Patent Office on Sep. 18, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A control apparatus comprising a main control section and a plurality of remote PLC devices connected via a communication line to said main control section; wherein said main control section comprises:

a PLC computing unit managing an entire system comprising said main control section and said plurality of remote PLC devices;

and a remote PLC communication control section executing data transaction through said communication line with said plurality of remote PLC devices, and also wherein each of said plurality of remote PLC devices comprises:

a communication control section executing data transaction via said communication line with said main control section;

a memory section for storing therein a sequence program transmitted via said communication line and specific to a specified remote PLC device;

a machine input/output I/F section executing data transaction with an external machine controlled by said specified remote PLC device; and a PLC computing section for executing PLC processing with said sequence program according to at least data transmitted from said main control section and data obtained from said machine input/output I/F section.

2. A control apparatus according to claim 1; wherein a plurality of remote I/O units each having a communication control section executing data transaction via a communication line and a machine input/output I/F section executing data transaction with an external machine controlled by said system are connected to said communication line to which said main control section and said plurality of remote PLC devices are connected and data transfer between said main control section, said plurality of remote PLC devices, and said remote I/O units is executed with data frames each having identical frame length.

3. A control apparatus according to claim 1; wherein data transfer between said main control section and each of said plurality of remote PLC devices is executed with a data frame and this data frame contains at least header information indicating at least a station number and a transaction state of each of said remote PLC devices and data for said external machine driven by said specified remote PLC device.

4. A control apparatus according to claim 3; wherein a plurality of remote I/O units each having a communication control section executing data transaction via a communication line and a machine input/output I/F section executing data transaction with an external machine controlled by said system are connected to said communication line to which said main control section and said plurality of remote PLC devices are connected and data transfer between said main control section, said plurality of remote PLC devices, and said remote I/O units is executed with data frames each having identical frame length.

5. A control apparatus according to claim 1; wherein said main control section directs each of said plurality of remote PLC devices to repeatedly execute said PLC processing according to said sequence program specified to said specified remote PLC device, and also executes cyclic data transaction with said specified remote PLC device with a cycle not dependent on operations of a CPU of said main control section.

6. A control apparatus according to claim 5; wherein data transfer between said main control section and each of said remote PLC devices is executed with a data frame and this data frame contains at least header information indicating at least a station number and a transaction state for each of said remote PLC devices and data for said external machine driven by said specified remote PLC device.

7. A control apparatus according to claim 6; wherein a plurality of remote I/O units each having a communication control section executing data transaction via a communication line and a machine input/output I/F section executing data transaction with an external machine controlled by said system are connected to said communication line to which said main control section and said plurality of remote PLC devices are connected and data transfer between said main control section, said plurality of remote PLC devices, and said remote I/O units is executed with data frames each having identical frame length.

8. A control apparatus according to claim 6; wherein said header information contains information for downloading a specified sequence program to said specified remote PLC device.

9. A control apparatus according to claim 6; wherein said header information contains data for initialization for each of said remote PLC devices and information for starting and stopping when data is sent from said main control section to each of said remote PLC devices and information for starting and stopping when data is sent from each of said remote PLC devices to said main control section.

10. A control apparatus according to claim 1; wherein a remote PLC device executes said PLC processing by using data subjected to said PLC processing by said remote PLC device as well as data subjected to said PLC processing by another remote PLC device.

11. A control apparatus according to claim 1; wherein a remote PLC device can select any of data subjected to said PLC processing by said remote PLC device, data from said main control section, data inputted from said external machine, and data maintained in said remote PLC device by specifying a number of bits for each command code.

12. A control apparatus according to claim 1; wherein each of said remote PLC devices is allocated to at least one specific function.

13. A method of controlling with an control apparatus comprising a main control section and a plurality of remote PLC devices each connected via a communication line to said main control section; wherein said main control section determines the number of units of said plurality of remote PLC devices, ID numbers for said remote PLC devices, and switch information in an offline transfer mode, downloads a sequence program previously set in a specified remote PLC device, initializes said specified remote PLC device, provides an instruction for start of PLC processing to said specified remote PLC device, and said specified remote PLC device repeats execution of said PLC processing for data specified according to a sequence program specific to said specified remote PLC device until said device receives a stop command from said main control section and executes cyclic data transaction between said main controls section and said specified remote PLC device with a cycle not dependent on operation of a CPU in said main control section.

14. A method of controlling with a control apparatus according to claim 13; wherein data transfer between said control section and said remote PLC device is executed with data frames; said data frame comprising at least header information indicating a station number and a transaction state of said remote PLC device and data concerning said external machine driven by said remote PLC device.

15. A method of controlling with a control apparatus according to claim 14; wherein said header information contains information for downloading a specified program to said specified remote PLC device.

16. A method of controlling with a control apparatus according to claim 14; wherein said header information contains data for initialization of said remote PLC device and information for starting and stopping when sent from said main control section to said remote PLC device and also contains information concerning an operating state of said remote PLC device when sent from said remote PLC device to said main control section.

* * * * *